United States Patent [19]
Morimoto et al.

[11] Patent Number: 6,018,697
[45] Date of Patent: Jan. 25, 2000

[54] NAVIGATION SYSTEM FOR VEHICLES

[75] Inventors: Kyomi Morimoto; Takeshi Yanagikubo, both of Anjo, Japan

[73] Assignee: Aisin AW Co., Ltd., Japan

[21] Appl. No.: 08/764,010

[22] Filed: Dec. 11, 1996

[30]  Foreign Application Priority Data

Dec. 26, 1995 [JP] Japan .................................. 7-338662
May 29, 1996 [JP] Japan .................................. 8-134545

[51] Int. Cl.$^7$ ............................................... G06F 165/00
[52] U.S. Cl. ..................... 701/209; 701/207; 701/210; 701/211; 340/988
[58] Field of Search ................................ 340/995, 990, 340/988; 701/209, 208, 207, 210, 211, 201; 73/178 R

[56] References Cited

U.S. PATENT DOCUMENTS

| | | | |
|---|---|---|---|
| 5,115,398 | 5/1992 | De Jong ................................ | 364/443 |
| 5,521,633 | 5/1996 | Nakajima et al. ..................... | 348/118 |
| 5,642,106 | 6/1997 | Hancock et al. ...................... | 340/988 |
| 5,757,289 | 5/1998 | Nimura et al. ........................ | 340/995 |

FOREIGN PATENT DOCUMENTS

| | | |
|---|---|---|
| 0390052 | 3/1990 | European Pat. Off. . |
| 0488828 | 3/1992 | European Pat. Off. . |
| 4138270 | 5/1993 | Germany . |
| 19505487 | 9/1995 | Germany . |

*Primary Examiner*—William A. Cuchlinski, Jr.
*Assistant Examiner*—Arthur D. Donnelly
*Attorney, Agent, or Firm*—Lorusso & Loud

[57] ABSTRACT

In the disclosed navigation system, a distinctive object at an intersection or branch point already registered is recognized by image recognition in order that necessary action can be taken at the earliest opportunity by obtaining information as to the road on which the vehicle has advanced from the intersection or the branch point. The road on which the vehicle has advanced at the intersection or branch point is determined from the direction of relative movement of the distinctive object in the recognized image. Also, in order that easily understandable guidance can be provided even when intersections are in close proximity and even when a distinctive object is newly installed or removed at the intersection, assuming that the present position as detected is on the predetermined and guided route, a guidance message is composed by reading data relating to a point on the guided route, ahead of the present position, in the data stored in the information storage unit. The imaging is of the area of the road ahead using a video camera and the position of the distinctive object recognized in the image relative to the guidance point is determined and the preset guidance message is corrected based on that determination.

35 Claims, 25 Drawing Sheets

FIG. 3(A)

Road attribute data

Yes/No information Yes: ○

| Overpass/ underpass data | Overpass | |
|---|---|---|
| | Road alongside overpass | |
| | Underpass | ○ |
| | Road alongside underpass | |
| Number of lanes | 3 lanes or more | |
| | 2 lanes | ○ |
| | One lanes | |
| | No center line | |

FIG. 3(B)

Road name data

| Road type | In-type number |
|---|---|

| | | |
|---|---|---|
| Expressway | Main line | 1 |
| | Ancillary road | 2 |
| Municipal expressway | Main line | 3 |
| | Ancillary road | 4 |
| Toll road | Main line | 5 |
| | Ancillary road | 6 |
| National road | | 7 |
| Prefectural road | | 8 |
| Others | | 9 |

General road: National road, Prefectural road, Others

FIG. 3(C)

Precaution data

| Railroad crossing | ○ |
|---|---|
| Tunnel entrance | |
| Tunnel exit | |
| Road with reduced point | |
| No information | |

FIG. 3(D)

Driving guidance data

| Bear right | |
|---|---|
| Bear left | |
| Bear toward center | ○ |
| No information | |

FIG. 4

Intersection data

| Number of intersections (k) | |
|---|---|
| 1 | Intersection number |
| | Intersection name |
| | Traffic signal data |
| | Pedestrians' crossing data |
| | Branch point distinctive object data |
| | Entry road data |
| | Advancing road data |
| | Landmark data |
| ⋮ | |
| k | |

FIG. 5

Guidance phrase data

| Phrase type | Phrase content |
|---|---|
| A Distance phrase | 1  About 700 meter ahead<br>2  About 300 meter ahead<br>3  Very soon<br>4  Ahead of that point<br>5  Ahead of the present position<br>... ... ... ... ... |
| B Direction phrase | 1  Go straight ahead<br>2  Turn to right<br>3  Turn to left<br>... ... ... ... ... |
| C Distinctive object phrase | 1  Intersection without traffic signal<br>2  Next traffic signal<br>3  Second traffic signal<br>4  Intersection before traffic signal<br>5  Intersection after traffic signal<br>6  Next filling station<br>... ... ... ... ... |
| ⋮ | ⋮ |

FIG. 21
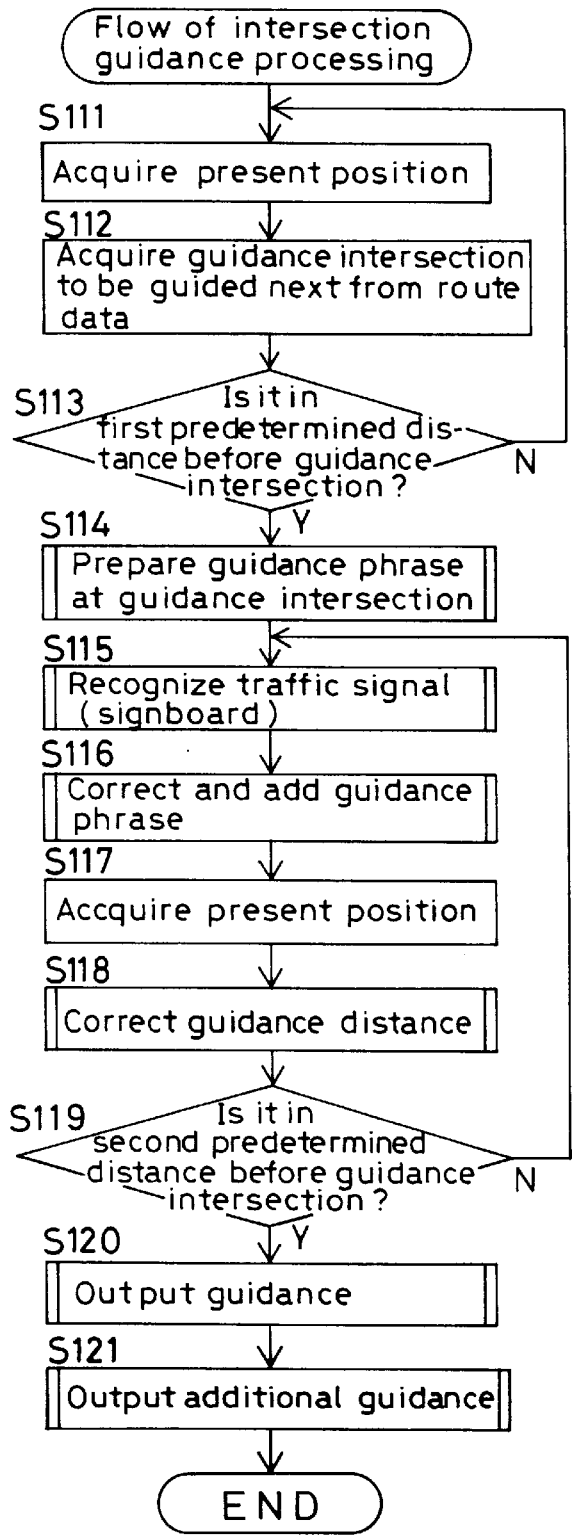
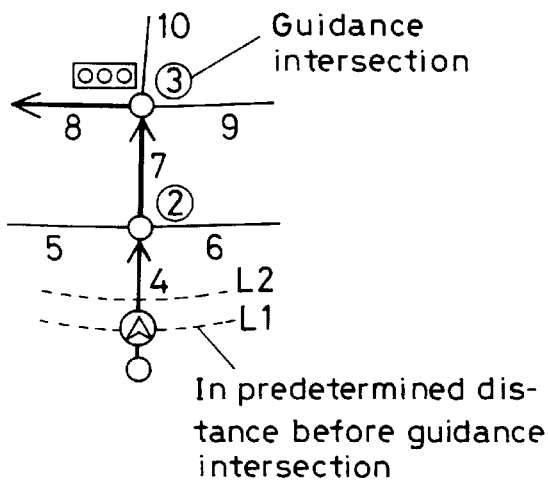

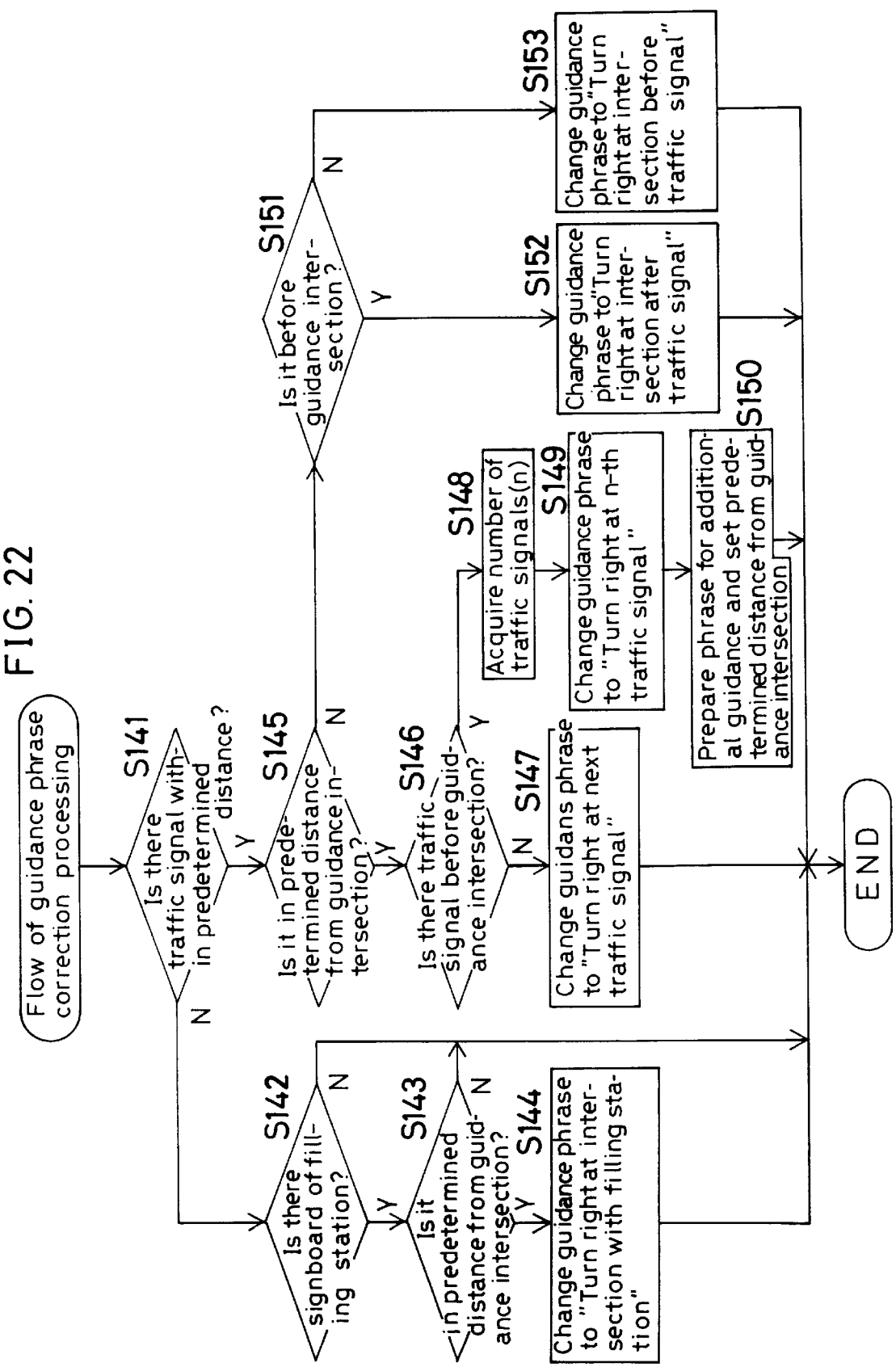

"Turn right at next filling station" or "Turn right at next filling station A"

"Turn right at next traffic signal"

"Turn right at 2nd traffic signal"

"Turn right at next traffic signal"

"Turn right at intersection after traffic signal"
"It is intersection without traffic signal"

"Turn right at intersection before traffic signal"

"Turn right very soon"

"Turn right at next traffic signal"

"Reaching the exit very soon"

"Reaching the exit very soon"

"Turn right at next traffic signal"

"Turn right at 2nd traffic signal" or "Turn right about 300 meters ahead"

"No entry to the road ahead. Do not enter."

"Execute re-searching"

"Turn right at next intersection"

NAVIGATION SYSTEM FOR VEHICLES

BACKGROUND OF THE INVENTION

1. Field of the Invention

The present invention relates to a navigation system for vehicles, by which route guidance is provided to an inputted destination along a route set in advance.

2. Prior Art

In a conventional type navigation system for vehicles, the estimated present position is obtained by map matching processing based on data from sensors in a present position detecting unit. Based on the present position of the vehicle obtained by this processing, guidance indicating distance to an intersection where the vehicle is to turn right or left or guidance for the next intersection or branch point after the vehicle has passed through an intersection is output by voice or other means. When the vehicle approaches close to the branch point, guidance is provided such as: "Turn right at the point about 300 meters ahead" or "Turn right at the next traffic signal." The above map matching processing must correct for positional deviation because detection errors of sensors are added and accumulated, and positional deviation between the calculated present position and the actual position would otherwise increase with time.

However, in the conventional type navigation system as described above, if accuracy of the map matching is low, it may take some time to make a match on the set driving route if there is positional deviation when the vehicle turns right or left at an intersection, even when the vehicle correctly follows the suggested (set) route. In such a case, the present position as indicated on the map display naturally deviates from the actual vehicle location, and the user cannot judge correctly and promptly whether or not the vehicle is correctly travelling along the suggested route. Also, when encountering a plurality of intersections within a short distance in an urban area, and guidance indicates that a right turn or left turn should be made, the user often has difficulty identifying the intersection to which the guidance pertains and cannot promptly judge which road is the suggested route. Further, when the vehicle has already entered an intersection and the driver has already decided to turn right, the route in advance is naturally already decided, and the driver wants to know whether or not the route of advance is consistent with the suggested route and wants to receive the next guidance message as quickly as possible. With the conventional systems, satisfaction of such driver requirements remains a problem.

Even when the present position has been accurately determined by the map matching, in the case of guidance indicating a right or left turn at an intersection, which guidance is given at a certain distance before the intersection, there are difficulties in the sensing of that distance due to variations in the speed of the vehicle and personal differences between drivers. In particular, in urban areas, there are many intersections within a short distance. Even when guidance is provided such as "Turn right about 300 meters ahead", it is sometimes difficult for the driver to recognize the intersection to which the guidance pertains. For this reason, there have in the past been proposed methods which display the name of the intersection or announce it by voice, but the driver may still have difficulty accurately recognizing the intersection.

SUMMARY OF THE INVENTION

To provide guidance for an intersection, it is much more convenient for a driver if reference is made to an easily recognizable object such as traffic signal lights, traffic signs, or signboards such as those of a filling station, convenience store, etc. However, traffic signal lights, traffic signs and signboards are often removed or additionally installed and, therefore, will differ from the situation at the time when the data base was prepared.

To solve the foregoing problems, it is an object of the present invention to provide a navigation system for a vehicle, which promptly provides information as to which route has been taken by the driver from an intersection or a branch point and to help the driver to decide the next action earlier.

It is another object of the present invention to provide a navigation system for a vehicle, by which the driver can promptly recognize, immediately after passing through an intersection, whether or not the route taken exiting the intersection or the branch point ("advancing route") is along the suggested route.

It is still another object of the present invention to provide a navigation system for a vehicle, by which it is possible to notify the driver of the action to be taken next, depending upon whether or not the vehicle is correctly following the suggested route.

To attain the above objects, the present invention provides a navigation system which, by way of guidance, identifies a characteristic feature of or a distinctive object at an intersection or branch point so that the driver can utilize that identification to recognize that intersection or branch point and the route taken by the vehicle in exiting the intersection or branch point is determined from the direction of relative movement of the characteristic or distinctive object in an image of the road area ahead of the vehicle.

Another version of the invention provides guidance for a preset optimal route to a destination along a preset route, and wherein a characteristic or distinctive object at the intersection or the branch point already registered is automatically recognized by imaging of the road ahead and the direction of advance at the intersection or the branch point is determined according to the direction the is distinctive object has relatively moved in the image, and the driver can thereby judge whether or not the vehicle is travelling the preset route.

Yet another version of the invention provides guidance for an optimal route to a destination along a preset route, wherein a characteristic or distinctive object at the intersection or the branch point already registered in stored data is recognized by image, judgement is made as to whether or not the vehicle has exited the intersection or branch point along the route set in advance based on relative direction of movement of the distinctive object in the image and, when it is found that the vehicle has adhered to the set route, the guidance message to be next provided is prepared.

In yet another embodiment of the present invention when it is found that the vehicle has deviated from the set route, the driver is notified of that finding.

In still another embodiment of the present invention when the vehicle is determined to be off of the set route, a search is made to determine a new optimal route from the detected present position to the destination.

Yet another version of the present invention includes present position detecting means for detecting the present position of the vehicle, information storage means for storing route data and data identifying distinctive objects at intersections and branch points, output means for providing guidance information, and guidance control means for executing a navigation program utilizing the data stored in the information storage means and for outputting the guidance information to the output means. Imaging (photographing, filming, electronic video, etc.) means obtains an image of a road area ahead of the vehicle and image recognition means scans the obtained image and recognizes any distinctive object at an intersection or branch point within the obtained image. Road identification means determines relative direction of movement of a recognized distinctive object in the image and identifies the road taken by the vehicle in exiting the intersection or the branch point ("advancing road") and, the guidance control means outputs guidance information to the output means according to the road identified by the road identification means. Of course, this embodiment may also provide guidance along a preset route. In this latter case guidance information for the preset route is continued beyond an intersection or branch point only if it is confirmed that the vehicle has remained on the preset route in exiting the intersection. Further, the system may be adapted to output a message advising the driver of detection of deviation from a set route.

The system of the present invention optionally further includes route re-searching means, whereby, in the case of a judgement that the road taken by the vehicle in exiting an intersection or branch point is not consistent with the reset route, the route re-search means searches the route data to determine a new route, and the guidance control means provides route guidance based on the new route.

The image recognition means may determine coordinates of the position of the recognized distinctive object at the intersection or the branch point, and the road identification means determines the direction of relative movement of the distinctive object in the obtained image based on the coordinates of its position. This may involve calculation of a moving vector based on difference between at least two coordinates of different imaged positions of the distinctive object, and then determination of the direction of movement of the distinctive object in the image based on this determined moving vector. In providing this function the road identification means may utilize a table of coordinates for the recognized position of a distinctive object stored in the information storage means.

Thus, in the present invention, objects located at an intersection or a branch point are recognized in an image of same, and the direction of advance exiting the intersection or the branch point is determined from the direction in which the image of the recognized object relatively moves in the image. As a result, it is possible to obtain information as to which road the vehicle has taken from the intersection or the branch point, without dependency on accuracy of map matching, and to notify the driver earlier to take necessary action.

Also, given the system's capability for providing guidance along a preset route, and for identifying the road taken from the intersection or the branch point ("advancing road") by image recognition, a judgement may be made as to whether or not this advancing road is along the preset route. As a result, the user can confirm that he or she has driven the vehicle correctly along the route, immediately after passing through the intersection, and can learn of deviation from the preset route immediately after passing through the intersection. These functions are particularly valuable in the case where intersections and branch points for which guidance ("guidance points") is to be provided are serially located in close proximity.

Another object of the present invention is to provide navigational guidance for an intersection ("guidance intersection") which prevents confusion which might otherwise be occasioned by the presence of another intersection before or after the guidance intersection and in close proximity thereto. Yet another objective of the present invention is to avoid the confusion which might otherwise be occasioned by the installation or removal of a distinctive object at the guidance intersection, such as a traffic signal, more recently than the last updating of the system's database. To achieve these objectives, the system of the present invention includes present position detecting means for calculating the present position of the vehicle, input means for inputting the information necessary for a search of stored route data and determination of an optimal route, output means for outputting route guidance information pertaining to the optimal route, information storage means for storing the route data, route setting means for searching the information input by the input means and the route data prestored in the information storage unit, route storage means for storing the route set by the route setting means, guidance control means for outputting guidance information to the output means along the set route, imaging means for obtaining an image of a road area ahead of the advancing vehicle, and image recognition means for recognizing distinctive objects in the thus obtained image. When the present location of the vehicle detected by the present position detecting means is on the set route, guidance expression setting means reads the data relating to a point ahead of the present position, for which guidance is to be provided ("guidance point"), from the information storage unit and prepares a guidance message relating to the guidance point. Judging means judges the position of a distinctive object recognized by the image recognition relative to the guidance point, and guidance information correcting means provides correct guidance information by correcting the guidance message set by the guidance expression setting means, based on the judgment of the judging means. The guidance information correcting means may prepare a new guidance message by adding to the guidance message initially prepared by the guidance message setting means, based on the judgment of the judging means.

The present invention may further include guidance message output position determining means for determining the proper location in advance of the guidance point, e.g. intersection, for output of the guidance message set by the guidance expression setting means, responsive to the judgment of the judging means.

Thus, according to the present invention, distinctive objects, such as traffic signals, at the guidance point are recognized in image, and guidance can be added or corrected according to the current condition of the distinctive objects and it is thereby possible to provide easily understandable guidance even where other intersections are present immediately before or after the guidance intersection and even when a distinctive object such as a traffic signal has been newly installed or removed. Further, by determining the position for output of the guidance message in accordance with the position of the distinctive object relative to the guidance point, guidance can be provided at proper timing. Further yet, when a distinctive object not identified by the stored data is recognized by the image recognition means, data relating to the distinctive object can be written into the stored database and proper guidance can be provided based on the new data.

BRIEF DESCRIPTION OF THE DRAWINGS

In the drawings FIGS. 1–7 are of general application, FIGS. 8–19 are specifically directed to a first embodiment and FIGS. 20–31 are specifically directed to a second embodiment.

FIG. 1 is a block diagram of an embodiment of a navigation system for a vehicle according to the present invention;

FIG. 2 illustrates an example of arrangement of files of route guidance data according to the present invention;

FIGS. 3(A)–3(D) illustrate files of additional route data according to the present invention;

FIG. 4 shows an example of arrangement of an intersection data file according to the present invention;

FIG. 5 shows an example of arrangement of a guidance phrase data file in accordance with the present invention;

FIG. 6 is a flow chart of a main routine for overall control of the navigation system of the present invention;

FIG. 7 illustrates construction of a route ("set route") by execution of the routine of FIG. 6.

FIG. 8 is a flow chart of a routine by which the guidance control means provides guidance for navigation through an intersection;

FIG. 9 is a continuation of the flow chart of FIG. 8;

FIG. 10 shows a display screen generated by execution of the routine of FIG. 8 and FIG. 9;

FIG. 11 is a flow chart of a routine for navigation through an intersection based on traffic signal image recognition;

FIG. 12 is a flow chart of a routine for determining relative movement of a traffic signal in an image of the road area ahead of the vehicle;

FIG. 14 is a flow chart of a subroutine for execution of step S30 in FIG. 9;

FIG. 15 is a continuation of the flow chart of FIG. 14;

FIG. 16 is a flow chart of a subroutine providing the re-search operation of step S52 of FIG. 14 and step S54 of FIG. 15;

FIG. 17 is a flow chart of another subroutine providing a search operation;

FIG. 18 shows another example of a routine for providing guidance at a branch point;

FIG. 19 is a continuation of the flow chart of FIG. 18;

FIG. 20 is a block diagram of a second embodiment of a navigation system in accordance with the present invention;

FIG. 21 is a flow chart of a routine for providing intersection guidance in the second embodiment;

FIG. 22 is a flow chart of a subroutine for guidance phrase correction in step S116 of FIG. 21;

FIG. 24 is a flow chart of a subroutine for guidance distance correction in step S118 of FIG. 21;

FIG. 27 is a flow chart of a subroutine for output of additional guidance, i.e. step S121 in the routine of FIG. 21;

FIG. 29 is a drawing illustrating another example of a guidance message change in accordance with the present invention;

FIG. 30 is a flow chart of a routine for a re-search to determine a new route in accordance with the present invention.

DESCRIPTION OF THE PREFERRED EMBODIMENTS

Figure 1:
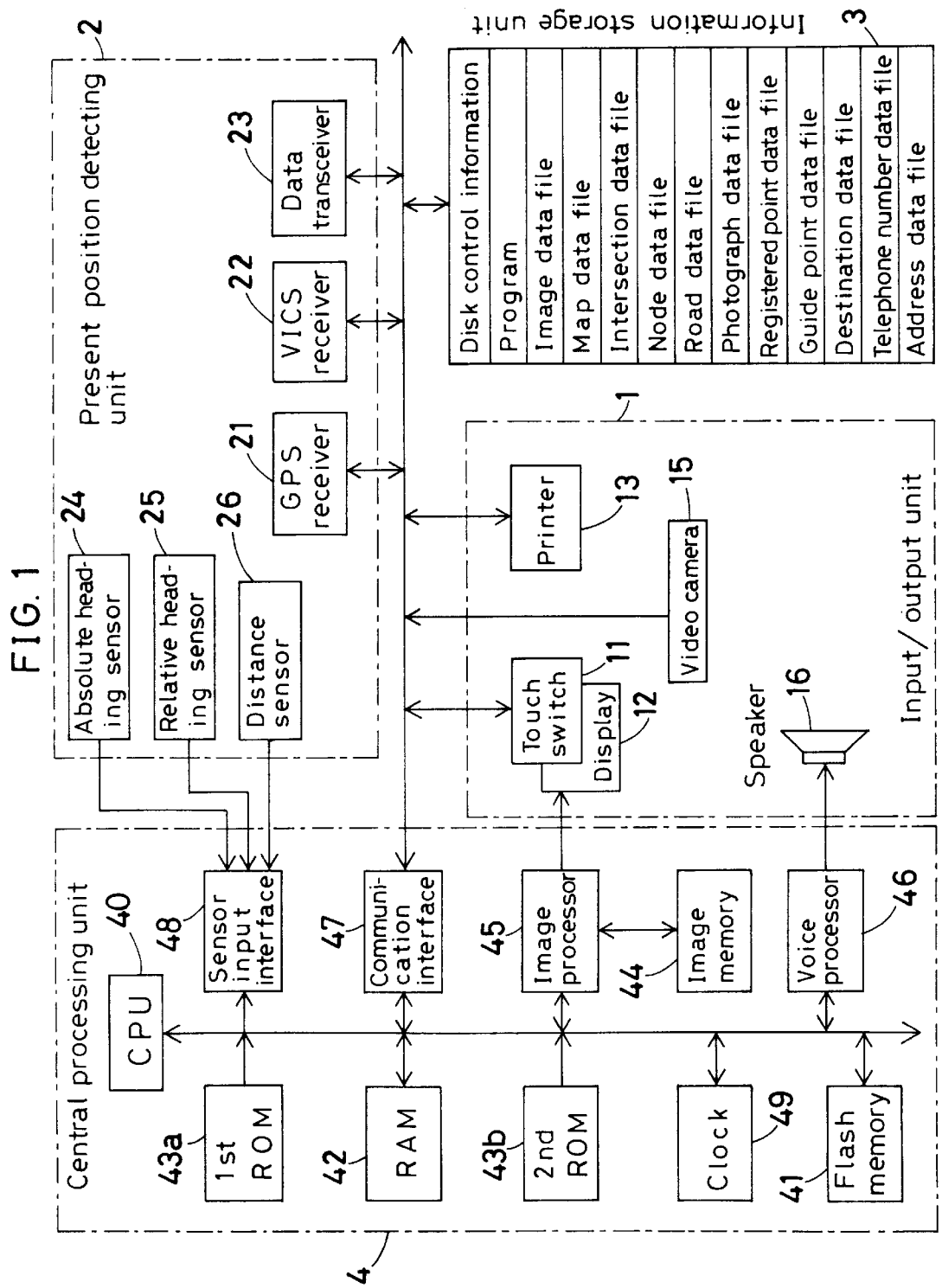

FIG. 1 shows an embodiment of a navigation system for a vehicle according to the present invention including an input/output unit 1 for inputting and outputting information relating to route guidance, a present position detecting unit 2 for detecting and receiving information relating to the present position of the vehicle, and an information storage unit 3 for storing navigation data necessary for calculation of an optimal route and guidance data for operation of a display/voice route guidance program (OS and/or application), etc., and a central processing unit 4 for carrying out processing for route search and display/voice route guidance and for controlling the entire system.

The input/output unit 1 functions to instruct the central processing unit 4 to execute navigation processing in accordance with the intention of the user and to printout data after processing so that the destination can be input or the user can receive guidance information, as necessary, by at least one of voice and screen display. To fulfill such functions, the input unit includes a touch switch 11 or an operation switch for input of the destination as a telephone number or map coordinates or to request route guidance. Of course, a remote controller may also be used as an input unit. Further, a video camera 15 for photographing or filming the area ahead of the vehicle is provided. The output unit includes a display unit 12 for screen display of input data or automatic screen display of route guidance in response to a request of the user, a printer 13 for printing out the data processed by the central processing unit 4 or the data stored in the information storage unit 3, and a speaker 16 for outputting route guidance by voice.

A voice recognition unit for inputting information by voice or a card reader, for reading the recorded data such as that stored in an IC card or magnetic card, may be added. Also, it is possible to add a data communication device for exchange of data with an external information source such as a personal computer wherein data specific to the user such as map data, destination data, etc. are stored in advance.

The display unit 12 includes a color CRT or a color liquid crystal display unit and outputs in color all pictures necessary for navigation, such as a route setting screen, a sector view screen, an intersection view screen, etc., based on map data and guidance data processed by the central processing unit 4. Further, buttons are displayed for setting the route guidance or for switching over to guidance or picture on the screen. In particular, information for a transit intersection such as the name of the transit intersection is given in pop up color display on the sector view screen as necessary.

The display unit 12 is installed in the instrument panel near the driver's seat, and the user can confirm the present position of the vehicle by watching the displayed map and can obtain information on the route ahead. The display unit 12 includes a touch switch (input unit) 11, i.e. a display of function buttons. By touching the buttons, the above operation can be carried out according to the input signal. The input signal generating means comprising the buttons and the touch switch constitutes the input unit.

The present position detecting unit 2 detects or receives information relating to the present position of the vehicle, and includes an absolute heading sensor 24 (a geomagnetic sensor or the like), a relative heading sensor 25 (a steering sensor, gyro, or the like), a distance sensor 26 for detecting the distance traveled from the number of wheel revolutions, a GPS receiver 21 utilizing the global positioning system (GPS), and a VICS receiver 22 serving as traffic information acquiring means or a data transceiver 23. The VICS receiver 22 receives road traffic information via FM multiplex, radio beacon, or optical beacon. The data transceiver 23 is, for example, a portable telephone or a personal computer, which transmits and receives information necessary for navigation to and from a remote traffic information center (such as ATIS), at the request of the user.

The information storage unit 3 is an external storage unit for storing navigation programs and data in external storage media such as CD-ROM ( "CD"), optical CD, IC card, etc. The navigation program includes a map drawing unit, a route searching unit, a route guidance unit, a present position calculating unit, a destination setting operation control unit, etc., and also has an application unit for executing navigation signal processing and an OS unit. Here, programs for routines such as route searching and display output control necessary for route guidance and voice output control necessary for providing voice guidance and data necessary for operation of these programs, as well as display information data necessary for route guidance and map display are stored. All types of data necessary for navigation such as map data, intersection data, road data, various guidance data, etc., are stored in the information storage unit 3.

More specifically, the stored programs include: a program for setting a destination or transit point based on position information from the present position detecting unit 2 and on input signals from the input unit 11 and for executing route searching using the road data, a program for converting the searched road data when the vehicle is off of the suggested route and for conducting a new route search, a program for determining voice output timing or content of voice phrases based map matching, etc., en route, and a program for recognizing distinctive objects from the images recorded by the video camera 15, serving as an image photographing or filming means, for judging relative direction of movement the recognized distinctive object in the recorded image and for determining the road travelled from the relative direction of movement of the distinctive object. By executing the programs stored in the information storage unit 3, an external storage medium, each of the navigation functions of the present invention may be carried out.

The central processing unit (CPU) 4 includes a CPU 40 for carrying out various computations and a flash memory 41 for reading and storing programs from a CD loaded in the information storage unit 3. The flash memory 41 makes it possible to collectively erase the existing programs and to reload even when the CD program has been changed. CPU 4 further includes a first ROM 43a for storing programs for program checks and updating of the flash memory 41 (program reading means), a RAM 42 for temporarily storing route guidance information such as coordinates of the preset destination, road code No., etc. or the data under computation, and a second ROM 43b for storing display information data necessary for route guidance and map display. The program for carrying out updating as described above may be stored in the external storage unit.

An image memory 44 stores image data used for screen display on the display unit and an image processor 45 retrieves image data from image memory based on display control signals from the CPU 40 and processes and outputs the retrieved image data to the display unit 12. A voice processor 46 synthesizes voice phrases, collected sentences, etc., read from RAM 42, based on the voice output control signals from CPU 40, and outputs the synthesized voice message to the speaker 16 after conversion to analog signals. A communication interface 47 transmits and receives input/output data to/from the communication device 5, and a sensor input interface 48 receives sensor signals from the present position detecting unit 2. The clock 49 is for entering date and/or time for internal dialog information.

Images of the road area ahead are converted from analog signals to digital signals by CPU 40 and are stored in RAM 42. From this image data, distinctive objects at intersections and branch points are recognized and image recognition processing is carried out. In the image recognition processing, the distinctive object is recognized by comparison with information on color and shape in the image data file stored in the information storage unit 3.

In the central processing unit 4, when the data acquired by the sensors of the present position detecting unit 2 is received through the sensor input interface 48, the CPU 40 calculates coordinates of the present position at fixed time intervals, and the data is written temporarily on RAM 42. The present position coordinates are processed by map matching processing by taking detection errors in the various data into account. Output values of the various sensors are constantly corrected. In this case, route guidance is carried out by screen display and/or voice output, at the option of the user.

Figure 2:
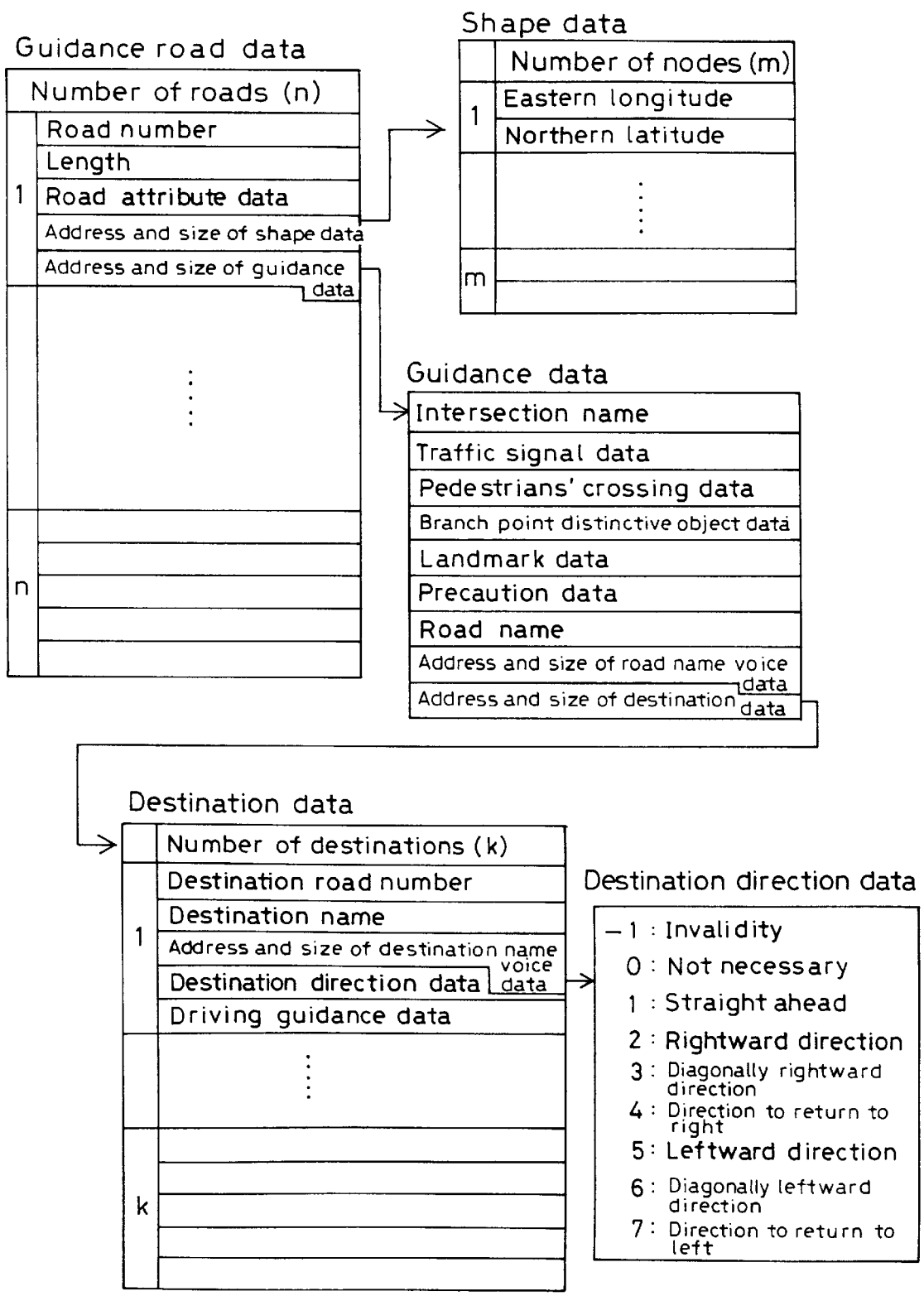

FIG. 2 and FIG. 3 show examples of arrangement of major data files stored in the information storage unit 3 shown in FIG. 1. FIG. 2(A) shows a guidance road data file where data for the route calculated by the route calculating means and data necessary for route guidance is stored. For each of the roads ("n" in quantity), road number, length, road attribute data, address and size of shape data, and address and size of guidance data are provided. A road number is set for each road segment between branch points and for both an outward course and a return course. The road attribute data are as shown in FIG. 3(A) and are the data for information such as overpass, road alongside overpass, underpass, road alongside underpass, or number of lanes. The shape data includes, as shown in FIG. 2(B), coordinate data such as eastern longitude or northern latitude for each of plural nodes ("m" in quantity), with each road being divided into a plurality of nodes.

The guidance data, as shown in FIG. 2(C), consists of data for intersection (or branch point) name, presence or absence of traffic signal, pedestrians' crossing, distinctive object at branch point or landmark (traffic signal, traffic sign, signboard of filling station or convenience store), precaution information (railroad crossing, tunnel entrance, tunnel exit, road width reduced point, etc.), name of road (such as expressway, general road road type such as national road, prefectural road, and others), address and size of road name sound, address and size of destination data, etc. The precaution data, as shown in FIG. 3(C), includes data for railroad crossing, tunnel entrance, tunnel exit, road narrowing (lane reduction) point, or no information. In other words, the purpose of the precaution data is to give precaution information to the driver at railroad crossings, tunnels, etc., i.e. at locations requiring special caution, other than branch points and intersections. The road name data, as shown in FIG. 3(B), includes information on type of road such as expressway, municipal expressway, toll road, general road (national road, prefectural road, others) and through lanes or local lanes in expressway, municipal expressway and toll road.

The destination data, as shown in FIG. 2(D), includes information as to destination road number, destination name, address and size of destination name sound data, and destination direction data and driving guidance data, i.e. guidance messages such as "bear right", "bear left", or "bear toward center". The destination direction data includes information such as invalid (destination direction data is not used), not necessary (no guidance provided), straight ahead, rightward direction, diagonally rightward direction, direction to return to right, leftward direction, diagonally leftward direction, and direction to return to left. The driving guidance data includes, as shown in FIG. 3(D), data for providing guidance as to which lane the vehicle should be driven in and for guidance messages such as "bear right", "bear left", "bear toward center", or "no information".

In the present invention, traffic signals and landmarks are recognized by their image, and information such as presence or absence of traffic signals or landmarks (data of FIG. 2) and the driving guidance data of FIG. 3(D) need not necessarily be provided. If these data are stored, they should be rewritable.

In addition to information such as presence or absence of features such as traffic signals, pedestrian crossings or distinctive objects, positional information (such as absolute coordinates or position of features relative to intersection), and shape and pattern number of the distinctive object are stored. When such a feature is recognizable in an image of the area ahead of the vehicle, information relating to the shape and color of the feature is stored as acquired image data in the image data file. For example, for distinctive objects, data for shape patterns correlated with shape pattern numbers are stored, and this data is searched to judge whether or not the acquired image data includes one of the distinctive objects identified as such in the stored data.

In the data structure shown in FIG. 2, information relating to intersections is stored in the road data, while intersection data may be stored in a separate file, and information such as presence or absence of traffic signals and connecting roads may also be stored in separate files. However, it is better to include information on connecting roads within the road data because it is thereby easier to provide information such as "no entry" being allowed to a road from another road, and the amount of data stored may be reduced.

FIG. 5 shows examples of guidance phrase data. Guidance is provided divided into phrases such as distance phrases, direction phrases, distinctive object phrases, etc. In case guidance is to be output as voice, these phrases are combined together, and a message such as "Turn right about 300 meters ahead" is output at the preset guidance point in advance of where the turn it to be made.

Figure 6:
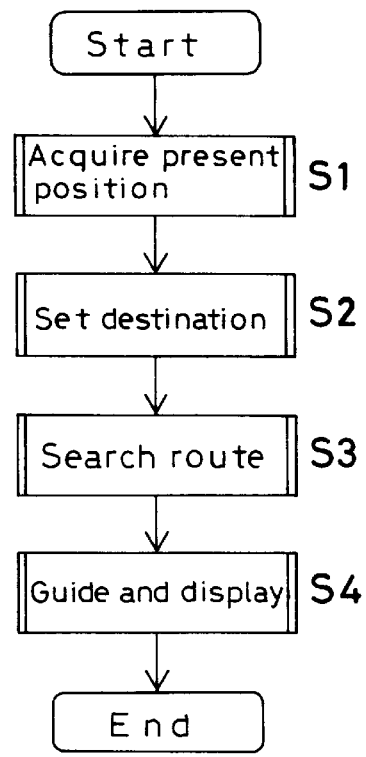
Figure 7:
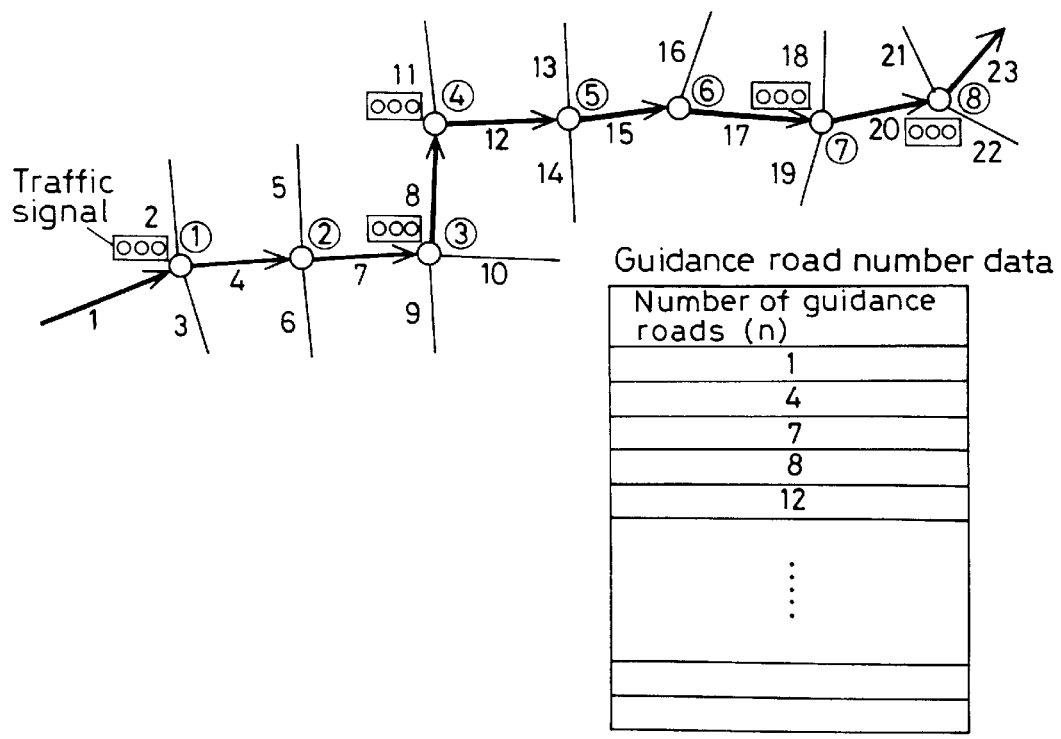

FIG. 6 is a flow chart of the main routine for operating the entire navigation system of the present invention. When execution of the navigation program is started by CPU 40 of the central processing unit 4, the present position is detected by the present position detecting unit 2, and a map of the vicinity around the present position is displayed, along with display of the name and other information pertaining to the present position (Step S1). Then, a destination is set by input of a telephone number, address, name of facility, registered point, etc. (Step S2), and the optimal route from the present position to the destination is determined by search (Step S3). The route to the destination is set as a guidance road with the numbers of the roads to be travelled arranged as shown in FIG. 7. When the route is determined, the present position is traced by the present position detecting unit 2, and the route to reach the destination is displayed (Step S4).

Figure 8:
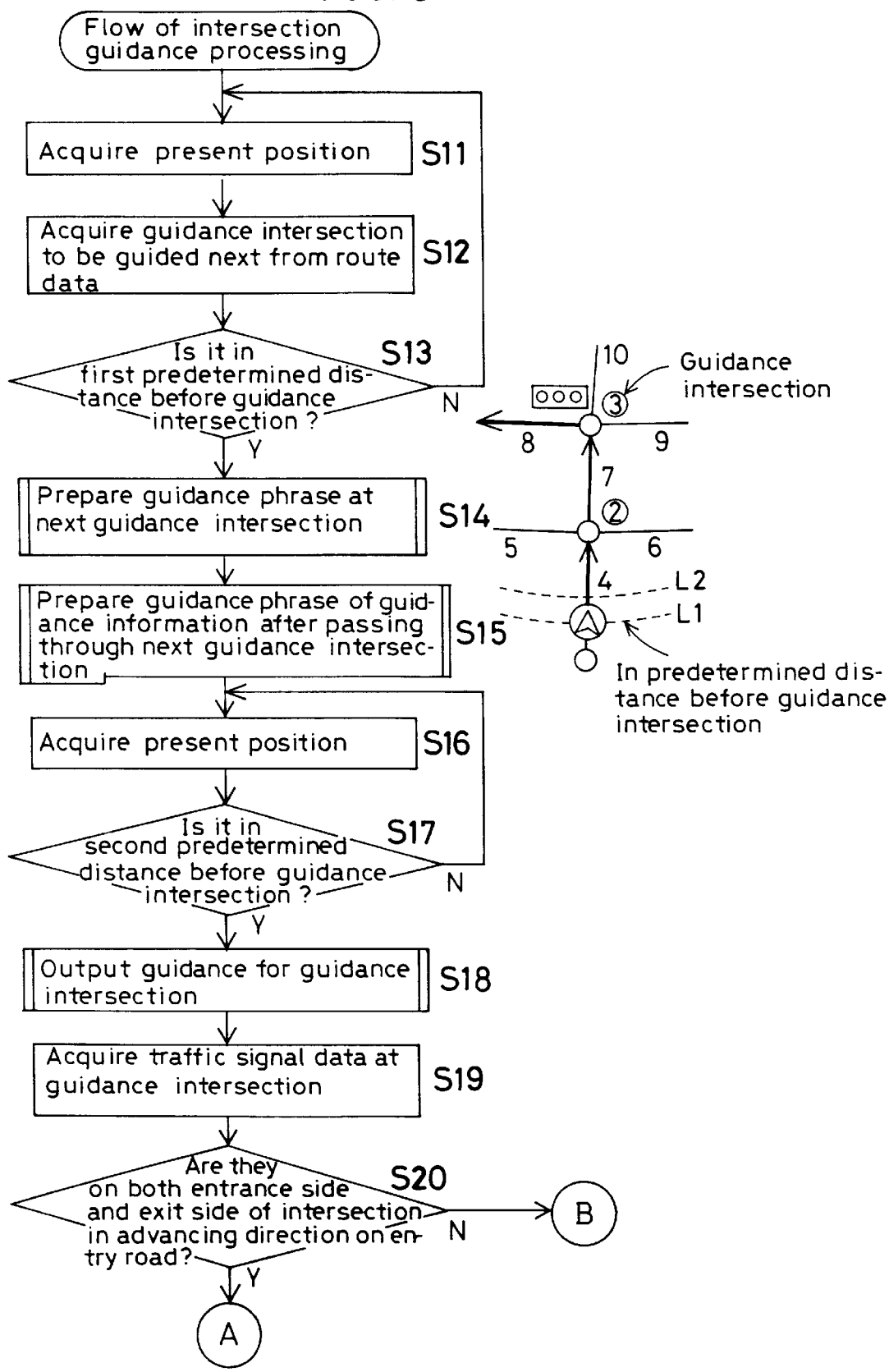
Figure 9:
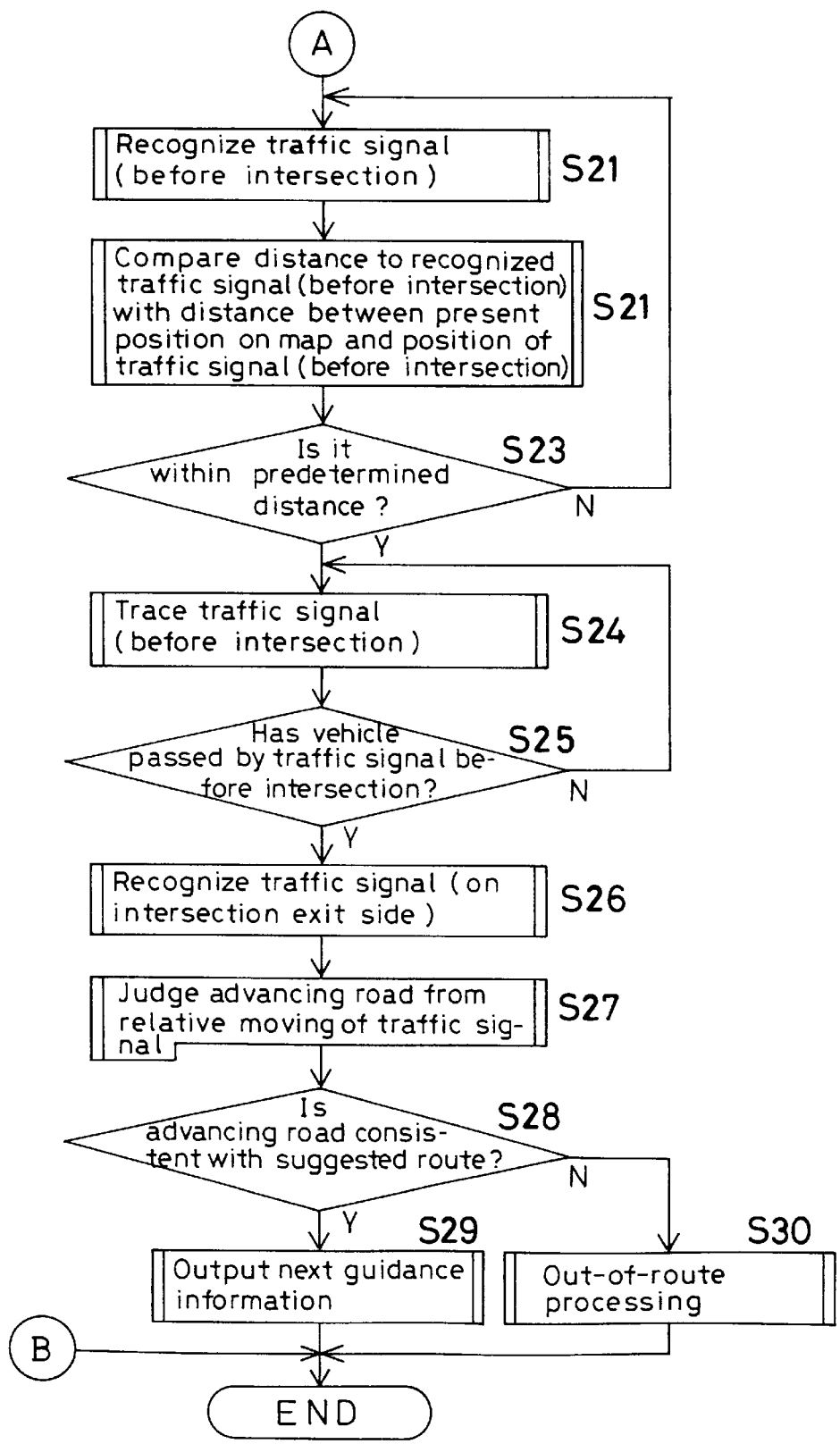
Figure 10:
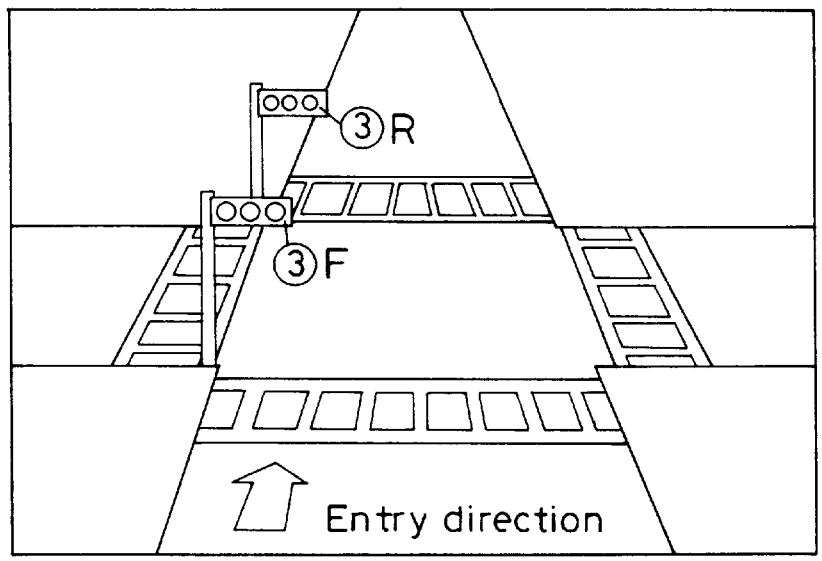

The present invention relates to processing of guidance information pertaining to an intersection in the guidance and display of Step S4. FIG. 8 to FIG. 19 all pertain to a first embodiment of the present invention. FIG. 8 and FIG. 9 together are a flow chart of a routine for processing of intersection guidance by guidance control means in the guidance and display step S4 of FIG. 6. FIG. 10 shows a screen display representing the output of that processing. In FIG. 8, after the present position of the vehicle is acquired (S11), data for the intersection for which guidance is to be next provided is retrieved from the route data (S12). Then, the distance from the present position of the vehicle to that next intersection is calculated, and it is judged whether or not the present position is at a first predetermined distance from that intersection (S13). When the vehicle reaches the point at the first predetermined distance in advance of the intersection (L1), a guidance phrase for that next intersection (3) is prepared (S14). Here, a guidance message is output to provide guidance along the preset route, such as "Turn left at about 300 meters ahead," derived from the guidance voice data of FIG. 5. Next, in Step S15, when it is judged that the vehicle has passed through the intersection for which guidance information has been provided, the message of guidance information relating to the route to be output next is prepared, e.g. a message such as "Turn right about 2 kilometers ahead", or "Drive along this road for a while", etc.

In Step S16, after the present position of the vehicle is again acquired, the distance is calculated from the present position of the vehicle to the next intersection for which guidance is to be provided and it is judged whether or not that calculated distance is at or within a second predetermined distance in advance of that next intersection (S17). When the vehicle reaches the point (L2) at the second predetermined distance before that intersection, guidance information for that intersection (3) is output (S18). In this routine, the guidance statement for the next intersection (4) may be prepared at the first predetermined distance preceding the approaching intersection (3), and the guidance message for that next intersection (4) may be output when it is judged that the vehicle has passed through the intersection (3) for which guidance information has been most recently provided.

In Step S19, the data for the traffic signal at the upcoming intersection is retrieved from the guidance data stored in the information storage unit 3 based on the road numbers included in the preset route, and it is judged whether or not there are traffic signals ((3)F and (3)R in FIG. 10) on either the entrance side or the exit side of the upcoming intersection on the entry road (S20). If there is no traffic signal on either side, the processing is completed. In case it is judged that there are traffic signals on both sides in Step S20, the routine advances to Step S21 of FIG. 9. The traffic signal (3)F before the intersection is recognized, and the distance to the recognized traffic signal (before the intersection) is compared with the distance from the present position on the map to that traffic signal (S22), and it is judged whether or not this is within the predetermined distance (S23). The judgment in Step S23 is made to prevent erroneous recognition in the case where there is a traffic signal at another intersection preceding the next guidance intersection (intersection for which guidance is to be provided).

In case it is judged that the traffic signal is within the predetermined distance in Step S23, movement of the vehicle relative to the traffic signal (before the intersection) is traced (S24), and it is judged whether or not the vehicle has passed that traffic signal in Step S25. A judgment that a traffic signal has been passed should be accompanied by movement of an image of the traffic signal to the upper portion of the display (recognition) screen and off of the screen. When it is judged that the vehicle has passed through it, the traffic signal (3)R (before the intersection) is recognized (S26), and advancing road judgment (identification of road travelled) processing is performed to determine how the traffic signal (3)R on the exit side of the intersection has moved on the recognition screen of FIG. 10 (S27). Next, it is judged whether or not the travelling road is consistent with the preset route (S28). If it is consistent, the next guidance message is issued (S29). If not, off-route processing is performed (S30).

In the embodiment shown in FIG. 8 and FIG. 9, there are traffic signals on both the entrance side and the exit side of the intersection along the travelled road, and the traffic signals on both sides are recognized; however, the routine may be modified so that only the traffic signal on the exit side of the intersection is recognized, and the road of advance travel may be determined according to the direction of movement of the signal. However, recognition of traffic signals on both the entrance side and the exit side of the intersection allows confirmation that the vehicle has advanced to the intersection in question because it is judged that it has passed through the traffic signal on the entrance side. This makes it possible to prevent erroneous identification of the intersection occasioned by the vehicle turning at another intersection immediately before the guidance intersection in question.

Figure 11:
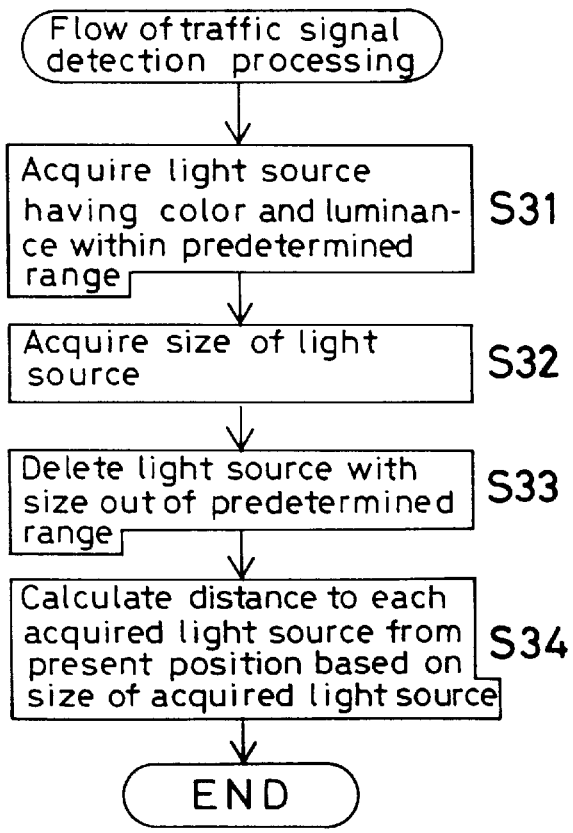

FIG. 11 is a flow chart of a subroutine for detection of a traffic signal in Step S19 of FIG. 8. First, from the photographed or filmed image of the area ahead, light sources having colors (blue, yellow and red) and luminance within the predetermined range are identified (S31). For this purpose, data for the three colors and the luminance range are stored in advance in the information storage unit 3. Next, size of the light source is determined (S32), and those sources having a size indicating them to be outside of the predetermined range are eliminated (S33). Then, distance from the present position to each of the light sources identified as being within the predetermined range is calculated according to the size of the acquired light source (S34). While elimination of the light sources having sizes outside of the predetermined range has been described, instead, the height of the light source may be identified and those light sources having heights outside of a predetermined range eliminated. Also, the shape (circular) of a traffic signal may be stored, and light sources may be categorized by comparison with the stored shape.

Figure 12:
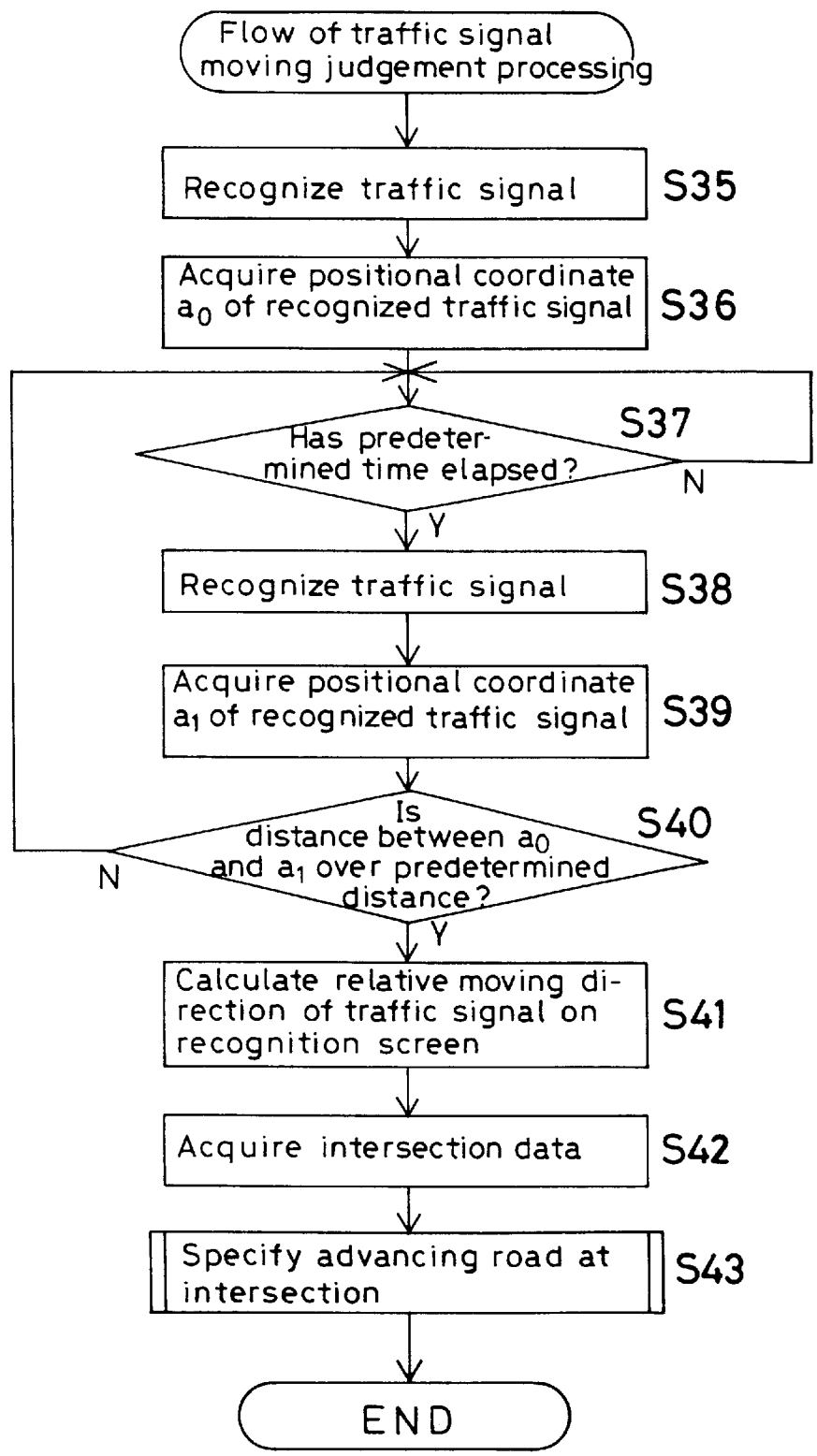

FIG. 12 is a subroutine for identification of the road travelled based on relative movement of the traffic signal in Step S27 of FIG. 9. The traffic signal (on exit side of the intersection) is recognized on the recognition screen (S35), and positional coordinate $a_0$ for the image of the recognized traffic signal is acquired (S36). After a given time has elapsed (S37), the traffic signal (on exit side of the intersection) is recognized (S38), and positional coordinate $a_1$ of the recognized traffic signal is acquired (S39). Next, it is judged whether the distance between positional coordinates $a_0$ and $a_1$ exceeds a predetermined distance (S40). By this judgment, even when the lane has been changed before the intersection, the position of the traffic signal on the exit side of the intersection will move relatively to the left or right, and it is judged that vehicle has turned left or right if relative movement of the traffic signal exceeds the predetermined distance. If it is judged that it exceeds the predetermined distance, relative direction of movement of the traffic signal on the recognition screen is calculated (S41), and intersection data is acquired (S42). Then, the road taken in advancing from the intersection is identified (S43).

The subroutine (FIG. 12) for determining the road advanced on from the intersection will now be described. The stored guidance road data (FIG. 3) or the stored intersection data (FIG. 4) includes data for the connecting relationship of the roads at the intersection. Based on the connecting relationship, the road taken in advancing from the intersection and shape of that road may be identified. Based on the shape of that road, a table is prepared to identify the road taken upon exiting the intersection, based on relative direction (vector) of movement of the traffic signal on the recognition screen.

Figure 13A:
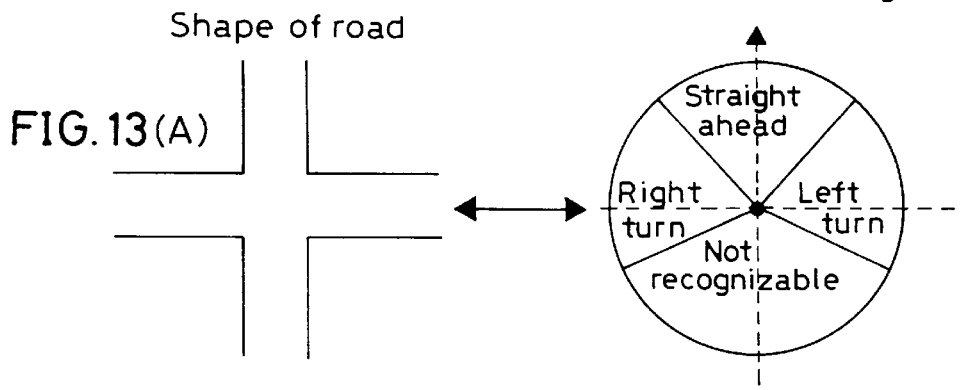
FIGS. 13(A)–(C) explain operation of the routine of FIG. 12, identifying the road taken in exiting the intersection.
Figure 13B:
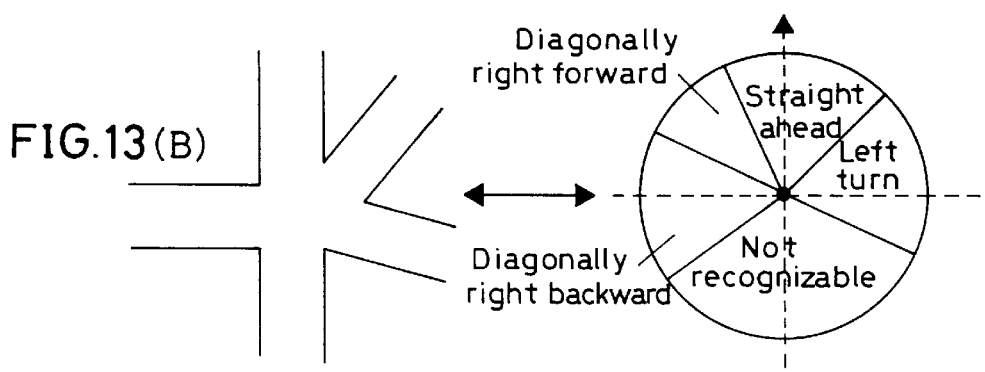
Figure 13C:
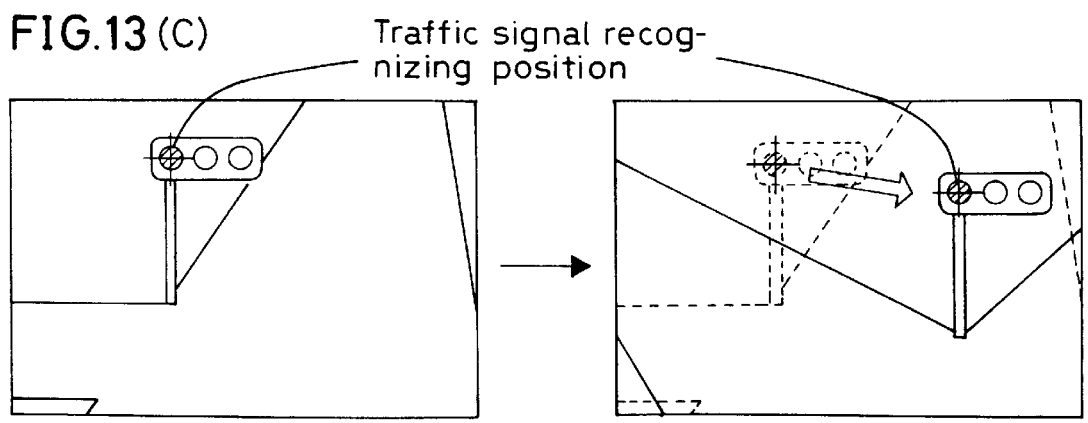

FIGS. 13(A) and (B) each represents a table to identify the road taken exiting the intersection based on direction of relative movement (vector) of the traffic signal and image recognition of the road shape. FIG. 13(A) shows the case of a 4-way intersection, and FIG. 13(B) shows the case of a 5-way intersection. The relative direction of movement (vector) of the traffic signal based on image recognition is obtained, and it is judged whether it is "straight ahead", "right turn", "left turn", or "not recognizable," depending upon the area in which the vector is directed, using the direction of straight advance (direction of the arrow in the table) as reference. For example, in case the recognized position of the traffic signal moves relatively to the right as shown in FIG. 13(C), it is judged that the vehicle has turned left. To identify the road of advance, the tables shown in FIGS. 13(A) and (B) may be stored in advance for each intersection on the preset road, or calculation may be made when providing guidance for an intersection.

FIG. 14 to FIG. 17 represent flow charts of the routine for off-route processing, i.e. Step S30 of FIG. 9. In Step S51 of FIG. 14, it is judged whether or not the auto re-route mode has been activated. This is a judgement as to whether or not the user has selected the switch for the automatic re-searching mode. If the automatic re-search switch is ON, re-search processing is automatically performed (S52), and the new route is displayed (S53). If not in the auto re-search mode, the routine advances to Step S54 of FIG. 15, and re-search processing is performed. Next, it is judged whether or not the re-search switch is on if it is NOT, the routine returns to S54. If ON, it is judged whether or not the vehicle is on new route determined by the re-search (S56). If it is on the newly determined route, the new route is displayed (S57). If it is not on the newly suggested route, the routine returns to Step S54. Thus, if it is in the auto re-route mode, re-search processing is performed before the re-search switch is turned on, and the newly determined route can be output as soon as the re-search switch is turned on.

Figure 14:
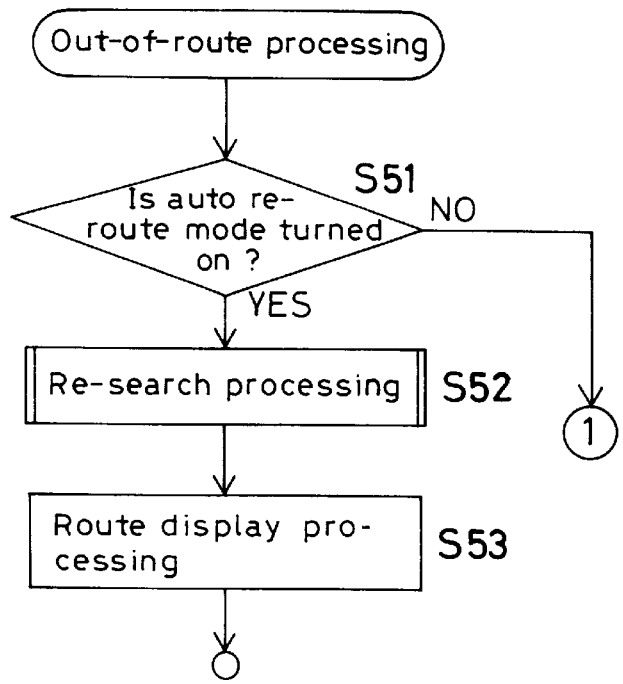
Figure 15:
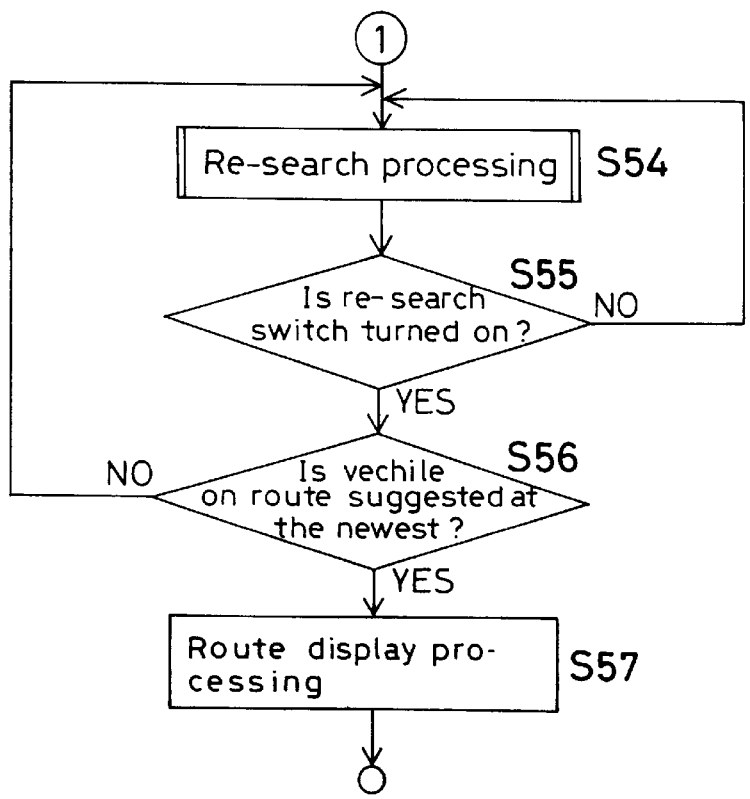
Figure 16:
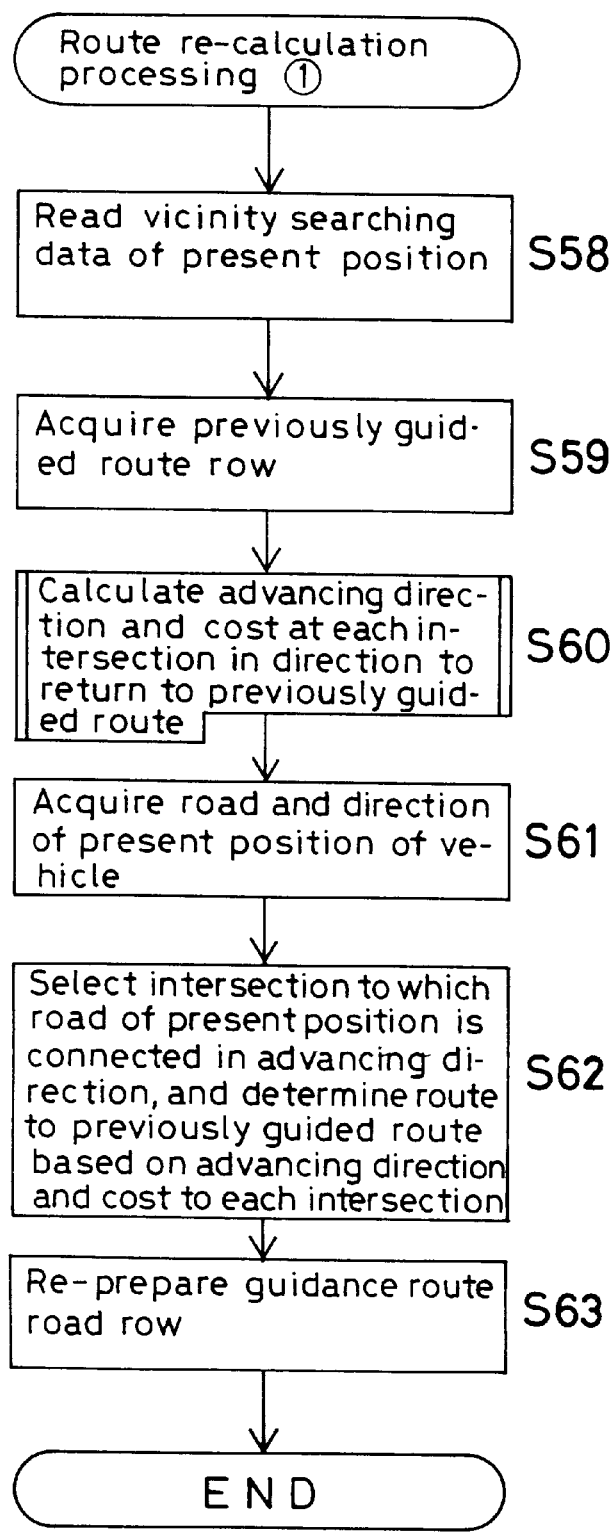

FIG. 16 is a flow chart showing an example of re-search processing of FIG. 14 (step S52) and FIG. 15 (step S54). First, search data related to the vicinity of the present position of the vehicle is read (S58), and the previous guidance route (guidance road number data of FIG. 7) is acquired (S59), and the direction of advance and penalty (cost) at each intersection on the route to return to the previous guidance route are calculated (S60). In the route search, the penalties are usually set based on required travel time, distance, ease of driving (road width, or road type such as national road), road tolls, etc., for each numbered road segment. When the penalties are assessed based on the distance, the ease of the drive based on road width, road type, etc., are converted to equivalent distance values. Thus, even though physically the same length, the adjusted distance is shorter for an expressway than for a main road of the same length but with access not so limited, while the adjusted distance is longer yet for a branch road. In the case of a correcting route for return to the previous guidance route, a given value or a multiplying factor is subtracted from the converted distance. By assessing the penalties, the optimal route is easily selected from among the candidates. Next, the road and the direction of travel at the present position of the vehicle are determined (S61), and intersections connecting with the road in advance of the present position are selected. Based on the direction of advance and the penalties accumulated at each intersection, the route for return to the previous guidance route is determined (S62), and a series of guidance route roads is again connected (S63).

Figure 17:
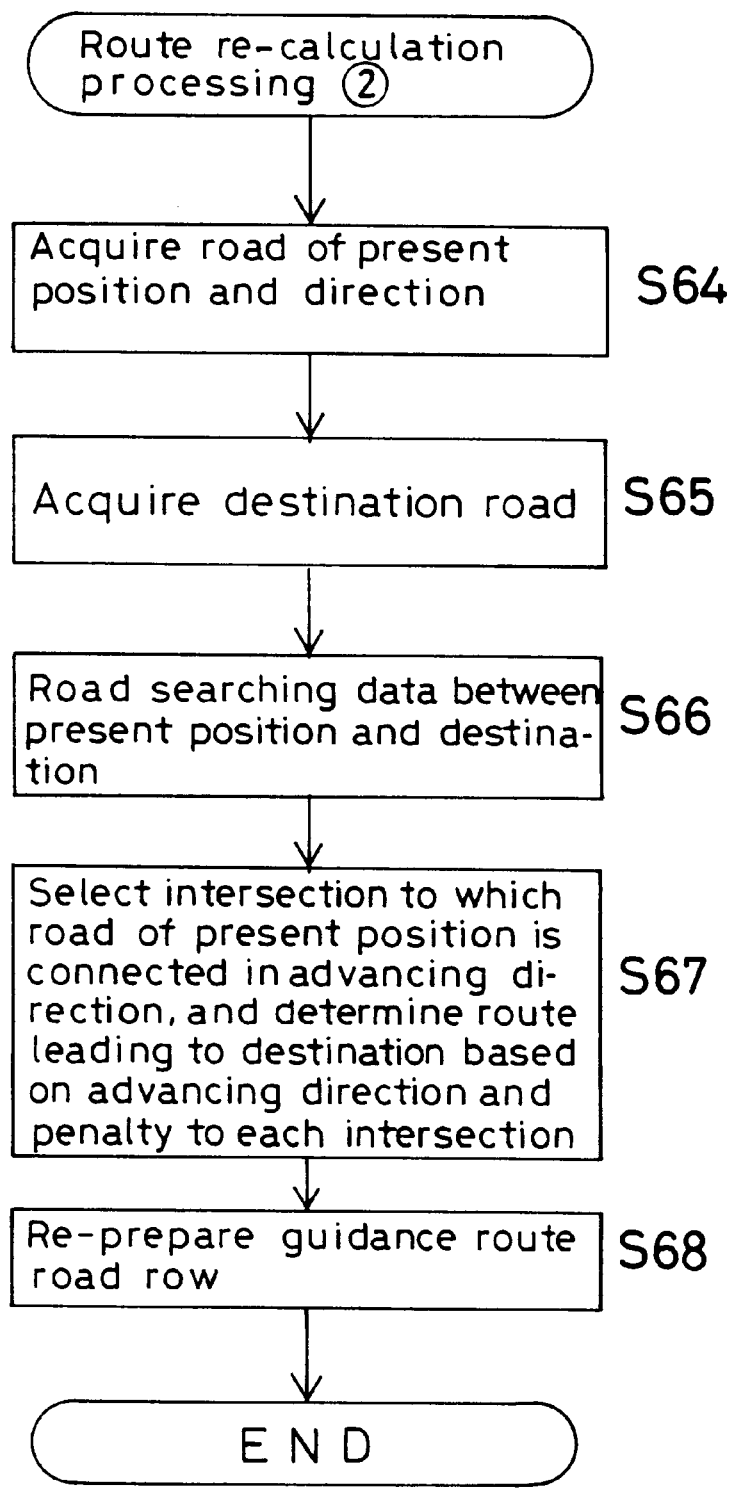

FIG. 17 is a flow chart of another routine for re-searching processing. In the re-searching routine of FIG. 16, wherein searching is performed only with search data related to the vicinity of the present location of the vehicle, and a route may not be obtainable because of conditions such as closing of a road. For this reason, all routes leading to the destination are re-searched in the is present embodiment. The road and the direction at the present position of the vehicle are determined (S64), and the destination road is acquired (S65). Then, road data for a route between the present position and the destination is read (S66). Then, intersections connecting with the road of the present location in the direction of advance are identified and penalties therefor are evaluated and all routes leading to the destination are evaluated in this manner to select a new optimal route in the form of a series of numbered guidance route roads.

Further, in the case where a route connecting with the original route cannot be identified using the vicinity search data only, the original route may be left on the display screen and may be indicated as the leading road, or the area of the vicinity for which search data is currently stored may be enlarged, or the search mode may be switched to a search of all routes leading to the destination as shown in FIG. 17.

In the off route searching as shown in FIG. 14 to FIG. 17, when the road of advancing travel is identified at the intersection in Step 43 of FIG. 12, execution of the research routine may be initiated when it is judged that the vehicle has advanced onto a road which is off of the route determined and set in advance, thus eliminating loss of time in output of a new guidance route.

Figure 18:
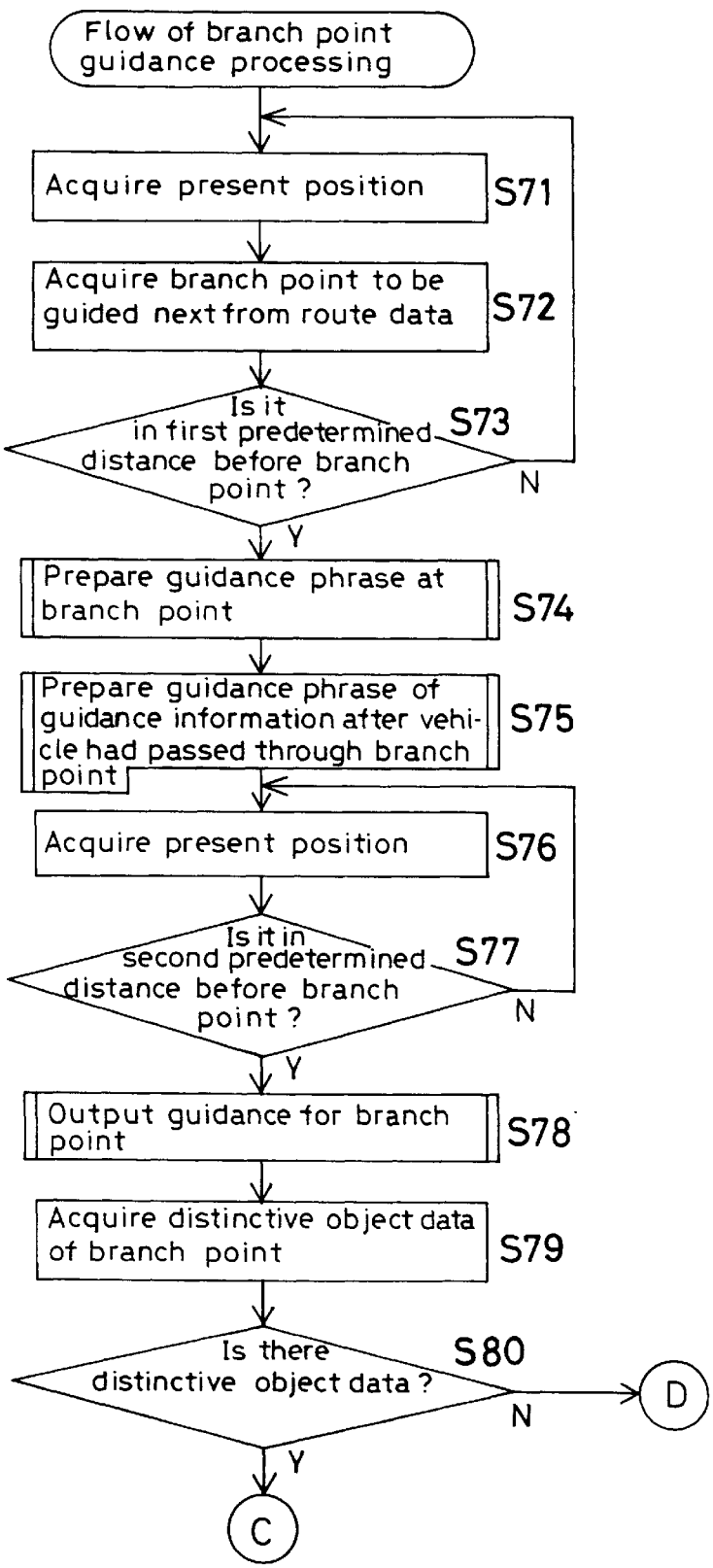
Figure 19:
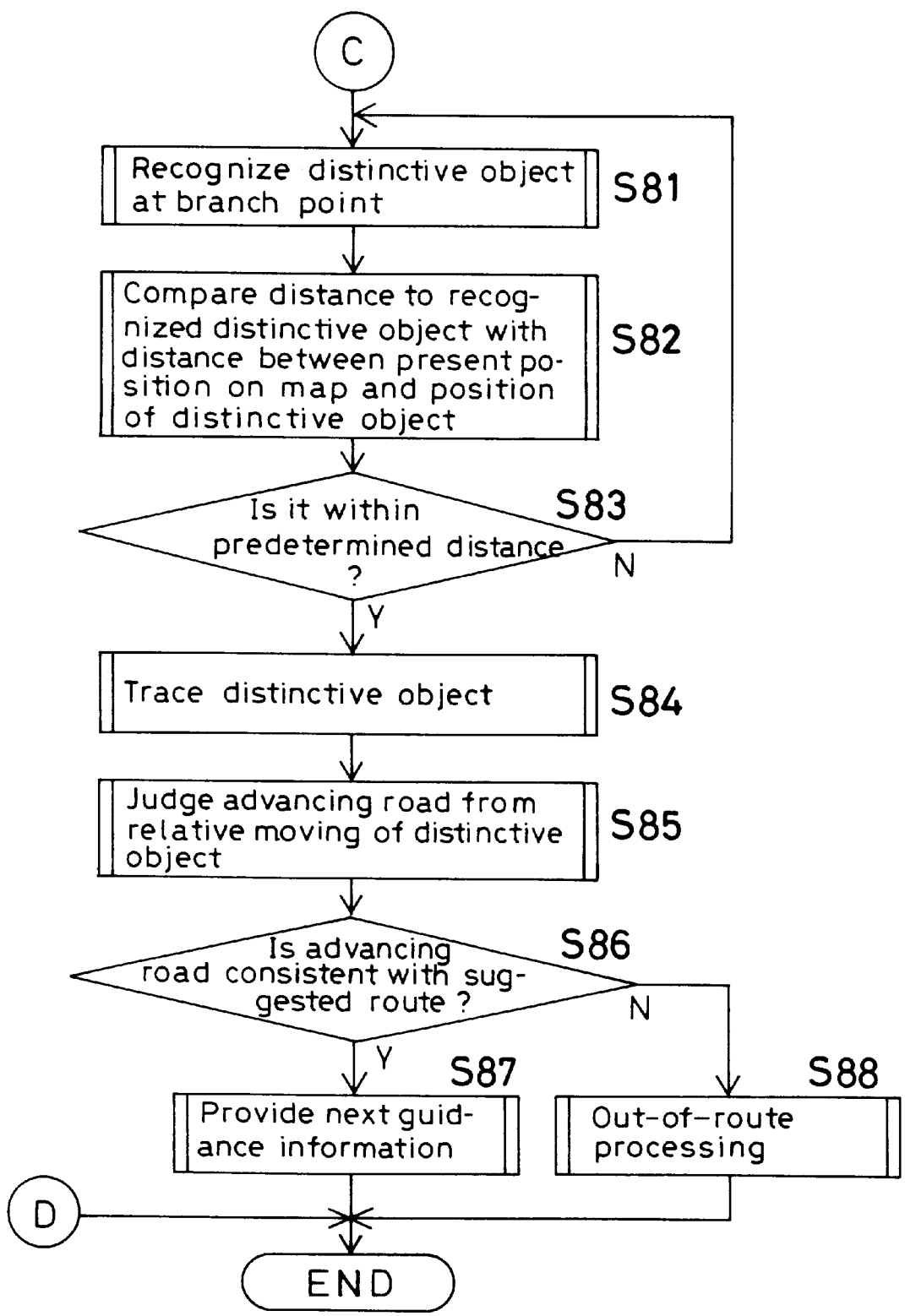

FIG. 18 and FIG. 19 show a routine for branch point guidance by the guidance control means. In FIG. 18, after the present position of the vehicle has been identified (S71), data for the branch point for which guidance is to be next provided is retrieved from the route data (S72). The distance from the present position of the vehicle to the branch point is calculated, and it is judged whether or not the present position is in advance of the branch point by the first predetermined distance (S73). When the vehicle reaches the point at the first predetermined distance before the branch point, the guidance message for the next branch point is prepared (S74). Here, for example, a guidance message such as "Turn left about 300 meters ahead" is prepared based on the guidance voice data of FIG. 5. Next, in Step S75, after the vehicle has passed through the branch point as instructed, the guidance message relating to the route to be next communicated to the driver is prepared. Here, for example, a message providing guidance after a turn is prepared, such as "Turn right at about 2 kilometers ahead" or "Drive along this road for a while", etc.

In Step S76, after the present position of the vehicle has been again determined, the distance from the present position of the vehicle to the intersection where guidance is to be provided is calculated, and it is judged whether or not it is within a second predetermined distance in advance of the branch point (S77), and when the vehicle reaches a point in the second predetermined distance in advance of the branch point, the guidance for the branch point is output (S78). In Step S79, the data for a distinctive feature at the branch point is retrieved based on the image of the area ahead. Here, the distinctive feature (object) may be a yellow flashing lamp on a divider strip at the branch point, a mark appearing on a divider strip (painted on concrete), a signboard of a filling station, pedestrians' crossing, etc.

Next, it is judged whether or not there is a distinctive object shown on the recognition screen (S80). If not, the routine is completed. In the case where it is decided that there is no distinctive object, the routine advances to Step S81 of FIG. 19. Then, a distinctive object at the branch point is recognized, and the distance to the recognized distinctive object is compared with the distance between the present position of the vehicle on the map and the position of the distinctive object (S82), and it is judged whether this distance is within the predetermined distance (S83). If it is judged to be within the predetermined distance (step S83), travel relative to the distinctive object is traced (S84), and a determination is made as to how the distinctive object has moved on the recognition screen (S85). Next, it is judged whether or not the road of advancing travel is consistent with the preset route (S86). If it is consistent, the next guidance message is output (S87). If not, the off route routine is executed (S88).

In the first embodiment of the present invention described above various changes and modifications can be made. For example, in the off route processing in Step S30 of FIG. 9 and in Step S88 of FIG. 19, the fact that the vehicle is off of the suggested route may be communicated by voice or by display. Thus, if it is found, as the result of identification of the road of advancing travel in Step S43 of FIG. 12, that the vehicle is off of the suggested route and this fact is communicated to the driver, the driver can take the necessary action at an earlier point in time. In the case were re-searching is to be performed in the off route processing, the driver may be notified that the route will be re-searched and that the vehicle will be guided along a new route.

In the above embodiment, map matching is usually performed based on the present position detected by the present position detecting means and road data stored in the information storage unit, and route guidance is provided based on the present position obtained by the map matching only in the case where there is data for a distinctive object at the intersection or branch point immediately ahead of the vehicle, the driver is instructed to turn right or left, based on image recognition. The driver may also be notified whether route guidance is based only on the usual map matching or on image recognition, by display or by voice.

FIG. 13 shows a table illustrating the path of advance through intersection relative to each road entering the intersection, based on the relative direction of movement of the distinctive object on the recognition screen. While only a range for relative direction of movement of the recognized image may be determined to identify the direction of advance along the present determined route ("suggested route") in order to determine whether or not the vehicle has advanced along the suggested route at each intersection, and if outside of the range for such a determination, operation may be switched to the off route search routine.

In the above embodiment, when relative direction of movement of the distinctive object at the intersection or the branch point recognized in image is obtained on the display, a vector of the direction of movement is obtained from the difference between coordinates at two points. Further, the direction in which the camera is pointed may be moved in such manner that the first recognized position of the recognized distinctive object is brought to the center of the recognition screen and this position is fixed, and then the direction of movement may be obtained, depending upon the direction and distance of movement of the image the distinctive object out of the camera's field of view. There is no limitation so long as the direction of movement of the distinctive object can be determined on the recognition screen (display screen).

The above embodiment has been described as providing guidance by voice messages such as "right turn" or "left turn" at the intersection or the branch point where the vehicle must turn right or left to follow the suggested route. For example, this can be applied to a location type navigation system, in which no route is preset and guidance is provided simply by overlapping the present position of the vehicle on a map, or to a simplified navigation system, in which no map is displayed and the name of the currently travelled road, name of the next intersection and/or distance to the next intersection is output based on the present position of the vehicle. Also, this invention can be applied to a system for route guidance, sequentially providing arrow indicators for right turn, left turn, etc., at the next intersection, or to a system where guidance by voice and guidance by display are simultaneously provided. In other words, the present invention can be applied to any type of navigation system, by addition of the capability for recognition of a distinctive object at intersection or branch point in an image, for determination of direction of advance of the vehicle by determination of the direction of relative movement of the object in the image, and for biasing output of guidance information upon identification of the road taken in advancing through the intersection or branch point.

Figure 20:
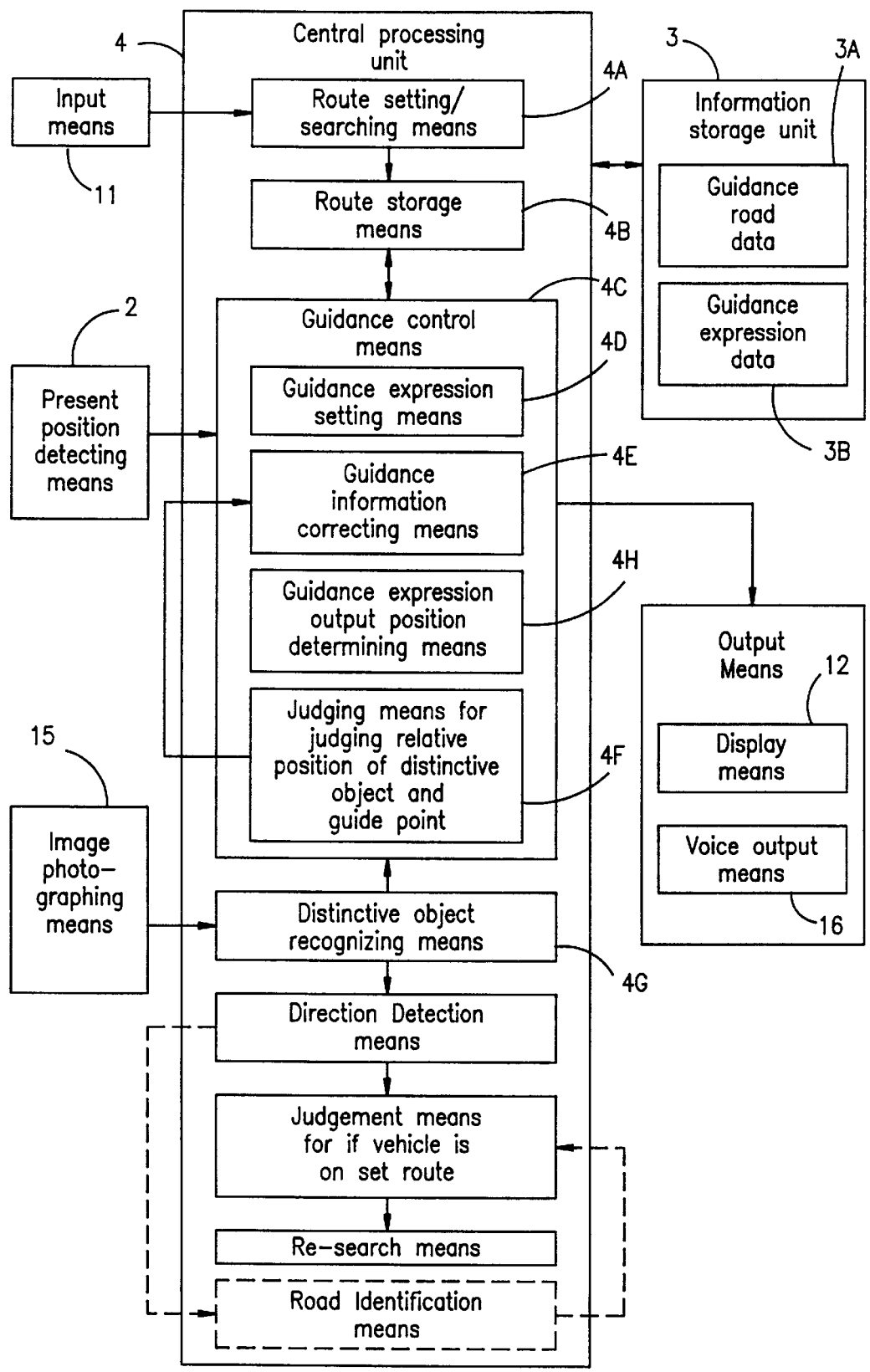
Figure 23A:
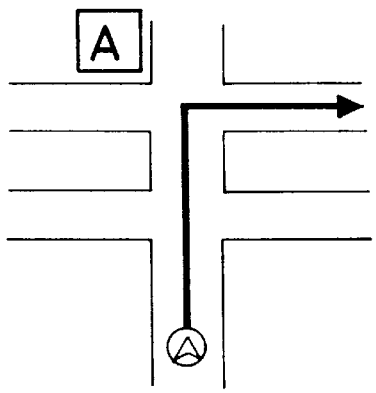
FIGS. 23(A)–23(F) illustrate operation of the guidance message correction subroutine of FIG. 22.
Figure 23B:
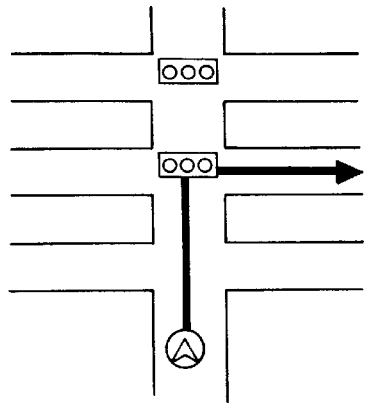
Figure 23C:
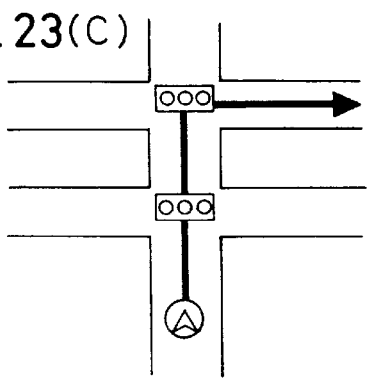
Figure 23D:
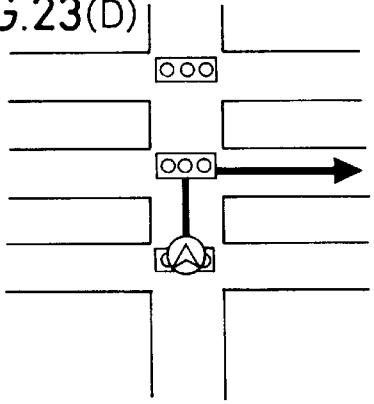
Figure 23E:
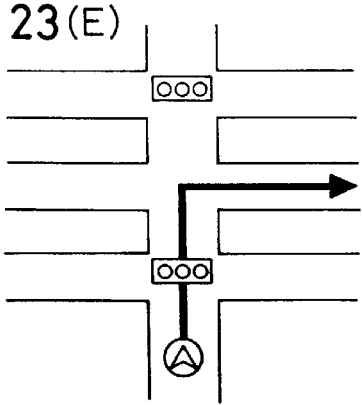
Figure 23F:
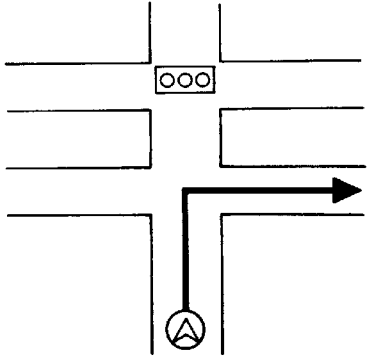

FIG. 20 to FIG. 31 all relate to a second embodiment of the present invention. FIG. 20 is a block diagram of hardware for providing the route guidance for an intersection (Step S4). The route setting means 4A calculates a route based on the information input through the input means 11 and on the guidance road data 3A stored in the information storage unit 3, and the route thus set is stored in the route storage means 4B. If the present position detected by the present position detecting unit 2 is on the route currently under guidance and stored in the route storage means 4B, the data relating to intersections for which guidance is needed ahead of the present position is read from the guidance road data 3A and the guidance expression data 3B in the information storage unit 3, and a guidance message such as "Turn right about 300 meters ahead" or "Turn right at the next traffic signal" relating to the next intersection for which guidance is to be provided is set by the guidance expression setting means 4D which controls the timing of output of the guidance message by the display means 12 and voice output means 16 of the output unit.

In the image of area ahead of the vehicle taken by the imaging means (video camera) 15, traffic signals, signboards of filling stations, family restaurants, convenience stores, etc., road signs indicating driving lanes, "no entry", etc. are recognized in the image of the road area ahead of the vehicle by the image recognition means ("distinctive object recognizing means") 4G. Based on the size of characters and images, distance between the vehicle and the distinctive object at an intersection is calculated. In case of a traffic signal, operating with the colors of red, yellow and green, the color of the light currently turned on at the signal is recognized and detected. In the case of signboards for filling stations and the like or road signs, characters and images are recognized and detected.

The judging means 4F judges the position of the distinctive object, e.g. traffic signal, thus recognized relative to the guidance point such as an intersection, and the guidance information correcting means 4E appropriately corrects the guidance information. For example, if the guidance message set according to the foregoing judgment process is "Turn right about 300 meters ahead", the message may be corrected to a more easily understandable message such as "Turn right at the next traffic signal". If, for example, the set guidance message is "Turn right at the next traffic signal" but another traffic signal has been installed, the message is corrected to one such as "Turn right about 300 meters ahead" or "Turn right at the second traffic signal".

The guidance expression output position determining means 4H determines the position for output of the guidance message set by the guidance expression setting means 4D, based on the judgment of the judging means 4F.

FIG. 21 illustrates a routine for operation of the guidance control means of FIG. 20 and serves to explain the generation of intersection guidance. First, the present position of the vehicle is determined (Step S111), and data for the guidance intersection for which guidance is to be next provided is acquired from the route data (Step S112). Then, based on the present position information thus acquired and the retrieved route data, distance from the present position to the next guidance intersection (intersection for which guidance is to be provided) is determined, and a judgement is made as to whether or not that determined distance is within the first predetermined distance in advance of the guidance intersection (Step S113). When the vehicle reaches the point at the first predetermined distance (L1) from the intersection, a guidance message for the guidance intersection is prepared (Step S114). Here, for example, a message based on the guidance voice data of FIG. 5 is prepared to provide guidance based on the determined route, such as "Turn left about 300 meters ahead." Next, in Step S115, traffic signals or signboards for filling stations or the like are detected in the video image of the area ahead of the vehicle (by the routine of FIG. 11). Based on the image information obtained by such image recognition, the previously prepared guidance message is corrected to provide a more easily understandable message such as "Turn left at the signal", "Turn left at the next filling station", etc. (routine illustrated in FIG. 22) (Step S116). Next, the present position is determined (Step S117), and the guidance distance is corrected (routine of FIG. 24) in Step S118. Then, distance is determined from the present position information thus acquired and the route data, and it is judged whether or not that determined distance is within the second predetermined distance preceding the next guidance intersection (Steps S117–S119). Until the vehicle reaches the point (L2) a second predetermined distance ahead of the intersection, the procedure of Steps S115–S118 is repeated. When the vehicle reaches the point (L2), the corrected guidance phrase is output, and further, additional guidance output (routine of FIG. 27) is executed.

As described above, a guidance message is prepared at the predetermined distance before the guidance intersection; however, the guidance message may be prepared immediately after the completion of guidance output at the guidance intersection which precedes the guidance intersection in question, and it may be retained in means such as RAM, or it may be prepared in advance after the route has been set.

Recognition of a traffic signal in Step S15 of the routine of FIG. 21, has already been described. Signboards for filling stations or the like may also be recognized. In the latter case, information relating to the image, size, height, etc. of signboards for each (oil) company may be stored in the information storage unit 3 in advance. The signboards located within a predetermined range from the scenery image ahead of the vehicle are detected, and the distance to each of the signboards is calculated.

FIG. 22 shows a routine for guidance message correction (step S111 FIG. 21), and FIGS. 23(A)–23(F) are a series of drawings illustrating specific examples. First, it is judged whether there is a traffic signal within the predetermined range (distance to the guidance intersection) (Step S141). If not, it is judged in Step S142 whether there is a signboard for a filling station or the like. If there is, it is judged whether or not it is within the predetermined range from the guidance intersection (Step S143). If it is within the predetermined range, the guidance message is changed in Step S144 to "Turn at the intersection where the filling station is located" (FIG. 23(A)).

In case it is judged that there is a traffic signal in Step S141, it is judged in Step S145 whether or not the traffic signal is within the predetermined range from the guidance intersection. If it is within the predetermined 10 range, it is judged in Step S146 whether or not that traffic signal is before the guidance intersection. If not, the guidance message is changed to "Turn right at the next traffic signal" in Step S147 (FIG. 23(B)).

If it is judged in Step S146 that there is a traffic signal before the guidance intersection, the number (n) of the traffic signals is determined. After the guidance message is changed to "Turn right at n-th traffic signal" in Step S149 (FIG. 23(C)), the message "Turn right at the next traffic signal," for additional guidance, is prepared in Step S150 (FIG. 23(D)), and the predetermined distance from the guidance intersection is set. The purpose of this additional guidance is to provide reliable guidance in the case that two or more intersections are located within relatively short distance of each other.

If the detected traffic signal is not within the predetermined range from the guidance intersection, it is judged in Step S151 whether or not it is before the guidance intersection. If it is before the intersection, the guidance message is changed in Step S151 to "Turn right at the next intersection after the traffic signal" (FIG. 23(E)). If it is not before the intersection, the guidance phrase is changed in Step S153 to "Turn right at the intersection before the traffic signal" (FIG. 23(F)).

Figure 24:
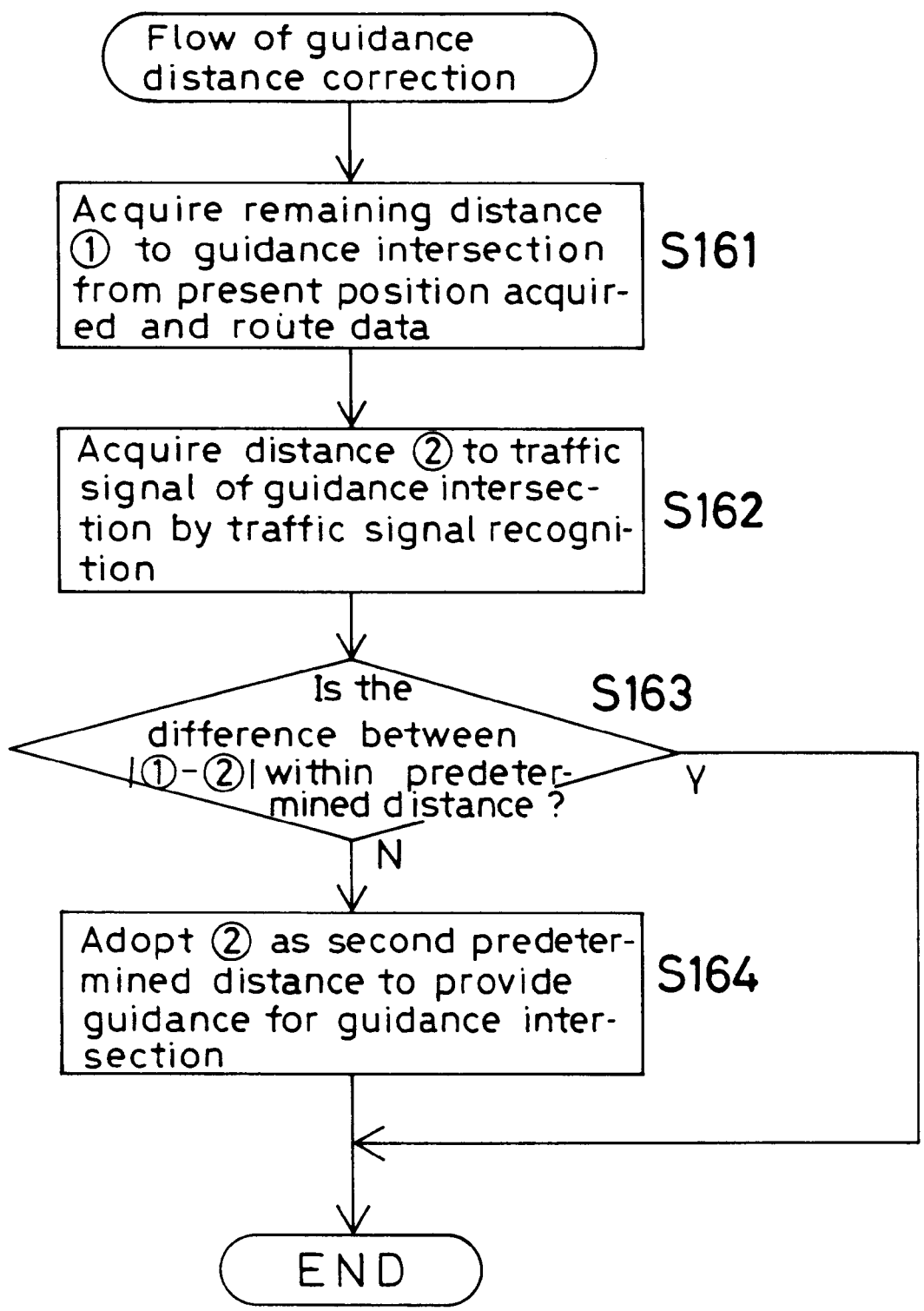

Next, the guidance expression output position determining means 4H of FIG. 20 will be described. FIG. 24 shows the routine for guidance distance correction in Step S118 of FIG. 21. First, from the determined present position and the route data, the remaining distance (1) to the guidance intersection is determined (Step S161), and the distance (2) to the traffic signal of the guidance intersection is determined by recognition of a traffic signal in the image for the area ahead of the vehicle (Step S162). Then, it is judged whether or not the absolute value of the difference between the distances (1) and (2) is within a predetermined range (Step S163). If it is within the predetermined range, it is left unchanged. If it is not within the predetermined range, the distance (2) is adopted as the second predetermined distance to provide guidance for the guidance intersection.

Figure 25A:
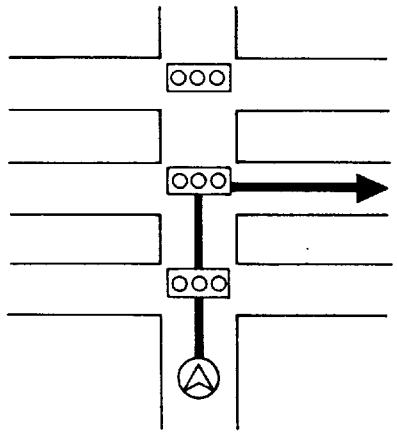
FIGS. 25(A) and 25(B) illustrate one example of guidance distance correction processing in accordance with the routine of FIG. 24.
Figure 25B:
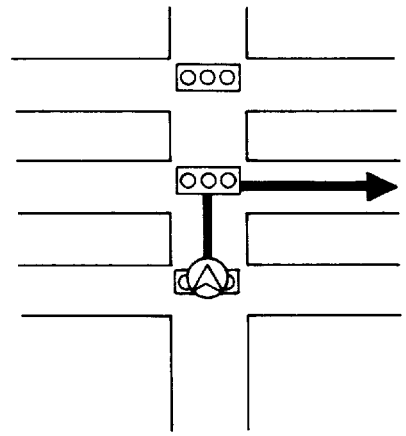

An example of guidance distance correction in accordance with the routine of FIG. 24 is shown in FIGS. 25(A)–25(B). In the case where intersections are located adjacent to each other within a short distance and the detected present position has deviated from the preset route, the timing for guidance may be off. Therefore, to provide reliable guidance, the traffic signal at the guidance intersection is recognized in the image of the area of the road ahead, the guidance distance is corrected, and a guidance message such as "Turn right at the next traffic signal," is output as shown in FIG. 25(B) at proper timing for this guidance distance. The guidance message "Turn right about 50 meters ahead" may be output depending on the distance to the traffic signal.

Figure 26A:
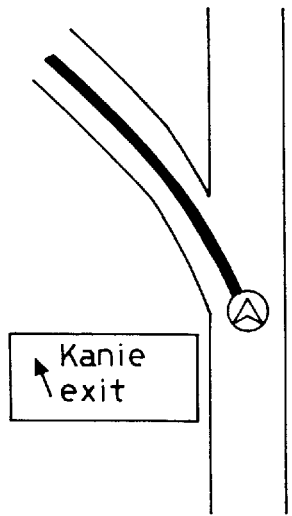
FIGS. 26(A) and 26(B) illustrate another example of guidance distance correction processing in accordance with the routine of FIG. 24.
Figure 26B:
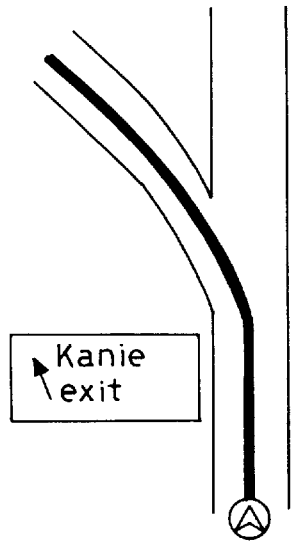

If the indicated position relative to a branch point stored in the data base (FIG. 26(A)) is different from the actual relative position as shown in FIG. 26(B), the timing of guidance for that expressway exit may be delayed. Therefore, by recognizing the actual exit sign in the video image and by providing guidance based on that detection of the actual exit sign, reliable guidance can be provided sufficiently in advance of the exit as shown in FIG. 26(B). In case the position of intersection or branch point as stored in the data base has changed or is otherwise inaccurate, the data base may be re-written and maintenance may be performed.

Figure 27:
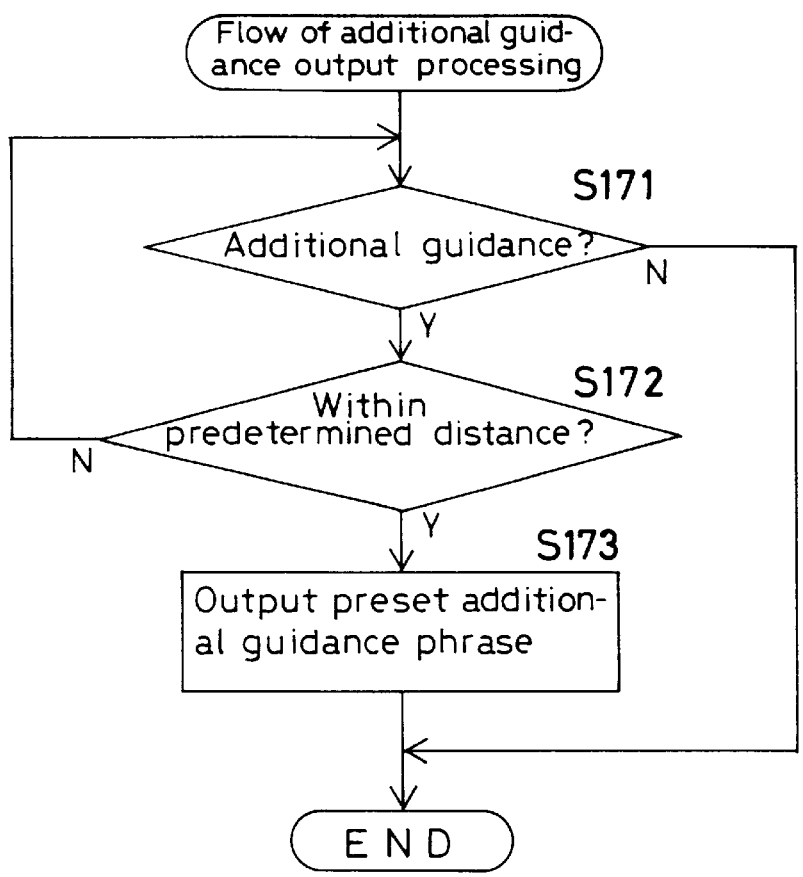

FIG. 27 shows a routine for providing additional guidance output (Step S121 of FIG. 21). Firstly, a judgement is made as to whether or not an additional guidance message has been set in step S150 of FIG. 22. If set, it is judged whether or not the vehicle is within the predetermined distance. When the vehicle reaches the point at the predetermined distance, the preset additional guidance message is output.

Figure 28A:
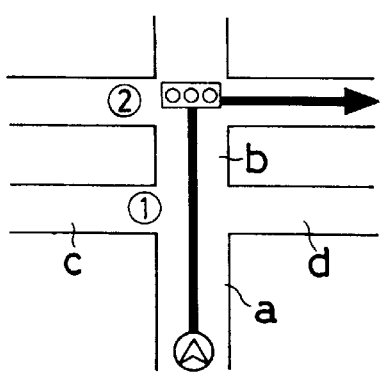
FIGS. 28(A) and 28(B) show another example of a guidance message change for a given location in accordance with the present invention.
Figure 28B:
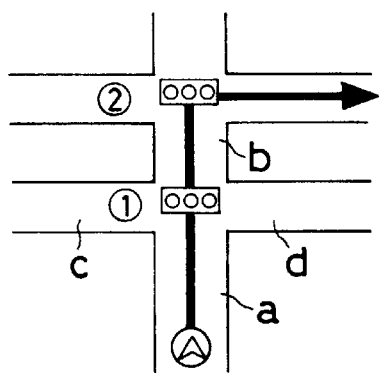

The case where correction of the guidance message is required by installation or removal of a traffic signal is illustrated in FIGS. 28(A) and 28(B). In FIG. 28(A), the intersection (1) of the road data "a" of the guidance route is stored in a data base as "without traffic signal", and it is described as "without traffic signal" in guidance. Thus, guidance is provided as "Turn right at the next traffic signal". As shown in FIG. 28(B), in case a traffic signal is newly installed at the intersection (1), the guidance message will not agree with the actual situation. When the traffic signal on the near side of the guidance intersection (2) is recognized in the video image, the guidance message may be changed to "Turn right at the second traffic signal" by taking the new traffic signal into account or a general guidance message such as "Turn right about 300 meters ahead" is issued at an appropriate distance from the guidance intersection (2).

When the contents stored in the data base are different from the data obtained by the image recognition, the data base should be updated. In the example of FIGS. 28(A) and 28(B) a traffic signal has been added at intersection (1). Thus, in the road data a, b, c and d for the roads connecting at the intersection (1), the data for the traffic signal (in the stored guidance data—FIG. 2(C)) is changed from "absent" to "present". Also, in the case of landmarks stored in the data base in advance as patterns, if a newly constructed landmark is detected in the video image, data for the new landmark is added to the guidance data. On the contrary, in case of landmark is present in the data base which can not be recognized in the video image, it may be deleted from the data base. In case of a landmark present in the data base which can not be recognized in the video image, it may be behind some object hiding it from view, in which case the data base may be left unchanged, and it may remain stored in the road data to provide general guidance as described above in connection with the intersection in question.

Figure 29:
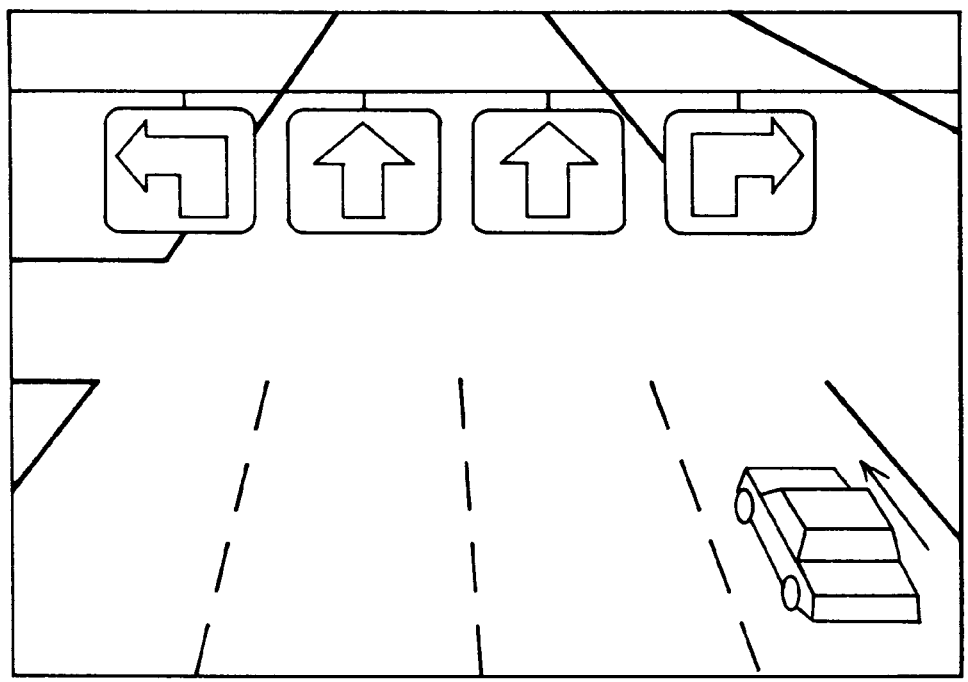

FIG. 29 illustrates another example of a guidance message change in the present invention. As shown in FIG. 29, by recognizing the traffic signs for lane identification, the lane where the vehicle is currently driven is recognized. Based on the recognized lane, guidance data may be changed or added. For example, the guidance message "right turn" is provided at the intersection (with traffic signal) after the intersection in FIG. 29, and guidance is provided such as "Turn right at the next intersection. Take special care to enter the lane for right turn at the intersection before" or "Turn right at the next intersection. You are driving in the right-turn lane. Confirm this, and move to through lane". If the intersection of FIG. 29 is an intersection where the vehicle must turn right, the traffic signs for the lanes may be recognized and lane guidance may be provided by specifying the lane where the vehicle is currently driven. Even when lane information is stored in the data base, the actual lane configuration may be changed by expansion of the road or otherwise, and more accurate guidance may be provided by image recognition of the current lane conditions. The information obtained by image recognition may be stored in the data base and may be output in the next route guidance based on the result of this learning.

Figure 30:
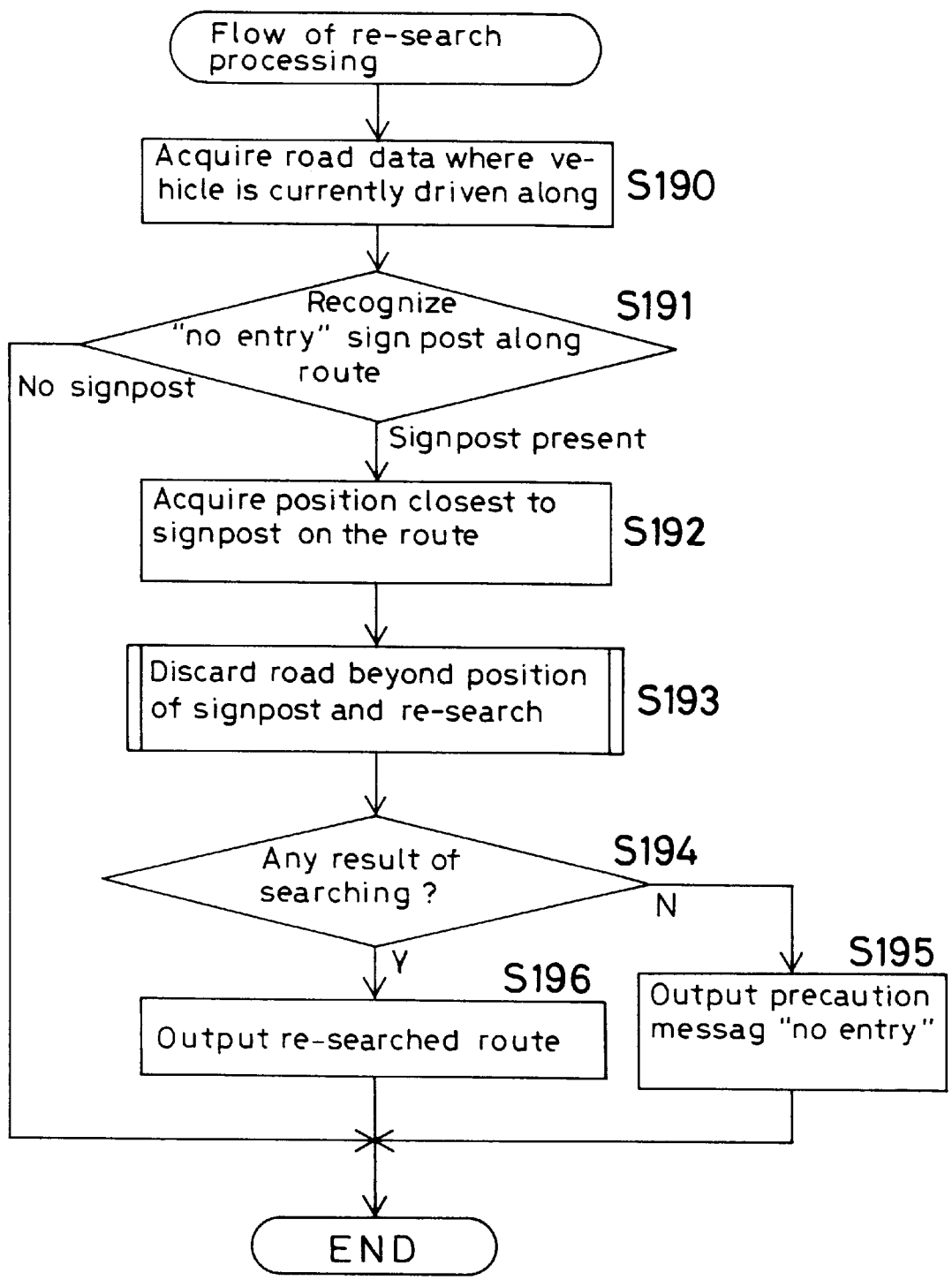
Figure 31A:
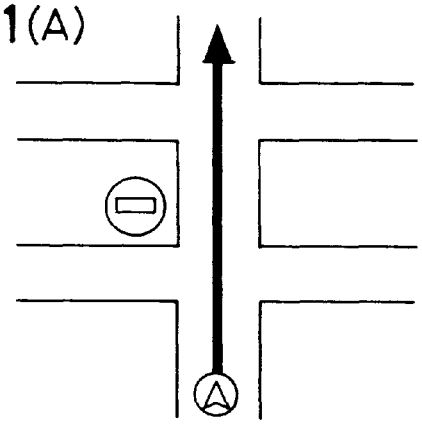
FIGS. 31(A), 31(B), 31(C) and 31(D) illustrate operation of the routine of FIG. 30.
Figure 31B:
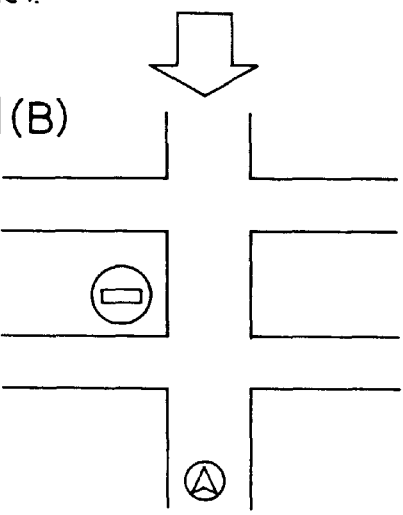
Figure 31C:
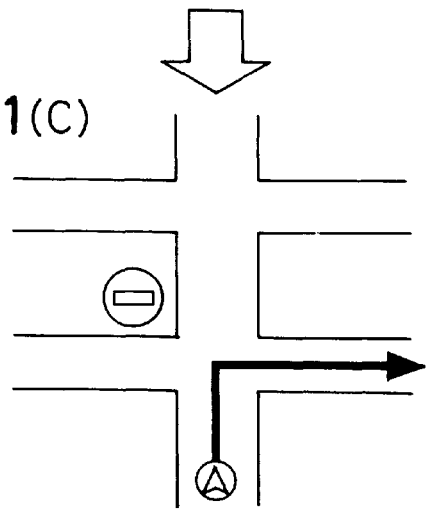
Figure 31D:
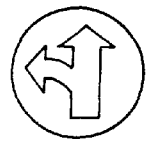

FIG. 30 and FIG. 31 relate to another example of a guidance message change in the present invention. In this example, traffic regulation of the road has been changed to newly create a one-way road, and the route leading to one-way road is part of the preset guidance route. When a road sign with the message "no entry" is recognized in image recognition, this road is discarded and re-searching is automatically performed. First, the data for the road on which the vehicle is currently travelling is acquired (Step S190), and the "no entry" sign along the route is recognized (Step S191). If there is such a sign, the position closest to the sign on the route is acquired (Step S192). As shown in FIG. 31(B), the road beyond the sign is discarded, and re-searching is performed (Step S193). In Step S194, it is judged whether or not the search has successfully identified a new route. If not, a "no entry" precaution message is output as shown in FIG. 31(A) (Step S195). If a new route has been identified by searching, the new route is output as shown in FIG. 31(C) (Step S196). In the case of a one-way road, there will be a sign such as "no right turn" shown in FIG. 31(D), in addition to the "no entry" sign. In such a case, the "right turn" road is discarded, and re-searching is performed.

In the case a message such as "300 meters ahead" or time information such as "7–9" (hours) is provided as distance information under the "no entry" sign, these may be recognized, and the road where the sign is posted (road where no entry is actually allowed) may be exited in advance in the case of "300 meters ahead", or the present time may be confirmed and re-searching may be performed to make the time match the indicated hours "7–9".

As it is evident from the above description, according to the present invention, a distinctive object such as a traffic signal at a guidance point is imaged, and guidance is added or corrected based on the present status of the distinctive objects such as traffic signals. Thus, even when there is another intersection before or after the guidance point, or when distinctive objects, such as a traffic signal, are installed or removed, guidance can be provided in a more easily understandable manner. Also, the location for output of the guidance is determined according to position of the vehicle relative to the distinctive object and the guidance point, and guidance can be provided adequately in advance. When a distinctive object not identified in the database is recognized by the distinctive object recognizing means, data relating to the distinctive object can be input, and it becomes possible to provide adequate guidance using the new data at any time thereafter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system for providing an operator of a vehicle with route guidance information, comprising:

information storage means for storing road guidance data and identification data for identification of a distinctive object registered for an intersection or branch point;

imaging means for obtaining an image of a road area ahead of the vehicle;

image recognition means for recognizing the distinctive object registered for the intersection or branch point in the obtained image;

road identification means for detecting relative direction of movement of said distinctive object in the image and, based on said detected relative direction of movement, for identifying a road travelled by the vehicle in exiting the intersection or branch point; and output means for outputting route guidance information to the operator, in the form of a visual display and/or a voice message, based on the identified road.

2. A navigation system for a vehicle providing an operator of the vehicle with route guidance to an input destination along a route set in advance, comprising:

information storage means for storing road guidance data and data for identification of a distinctive object at an intersection or branch point;

imaging means for obtaining an image of a road area ahead of the vehicle;

image recognition means for recognizing the distinctive object at the intersection or branch point by comparison of the image with said identification data;

road identification means for detecting relative direction of movement of said distinctive object in the image and, based on said detected relative direction of movement, for determining if the road travelled by the vehicle exiting the intersection or branch point is on the route set in advance; and output means for outputting route guidance information to the operator, in the form of a visual display and/or a voice message, based on the identified road.

3. A navigation system for a vehicle providing an operator of the vehicle with route guidance to an input destination along a route set in advance, comprising:

information storage means for storing road guidance data and identification data for identification of a distinctive object located at an intersection or branch point;

output means for communicating guidance information to a driver of the vehicle;

imaging means for obtaining an image of a road area ahead of the vehicle;

image recognition means for recognizing the distinctive object at the intersection or branch point in the obtained image; and guidance control means for detecting relative direction of movement of the recognized distinctive object in the obtained image, for judging, based on the detected relative direction of movement, if the vehicle has advanced from said intersection or branch point along the route set in advance and for determining guidance information based on the judgement; and output means for outputting, to the operator in the form of a visual display and/or a voice message, the guidance information determined by the guidance control means.

4. A navigation system according to claim 3 further comprising guidance message setting means for composing guidance information to be next output responsive to a determination that the vehicle is advancing along the set route.

5. A navigation system according to claim 3 wherein, if the vehicle is determined to have deviated from the route set in advance, said output means so notifies the driver.

6. A navigation system according to claim 3 further comprising:

present position detecting means for detecting the present location of the vehicle; and re-search means for, responsive to a determination that the vehicle has deviated from the route set in advance, searching said road guidance data to determine a new optimal route from the detected present location to the destination.

7. A navigation system according to claim 3 further comprising:

present position detecting means for detecting the present location of the vehicle, and wherein:

said direction detection means identifies the road taken by the vehicle in advancing beyond the intersection; and said guidance control means outputs guidance information to said output means for the road identified by said advancing direction detection means.

8. A navigation system according to claim 7, wherein, responsive to a judgement that the identified road is not on the route set in advance, said guidance control means additionally outputs a message to notify the driver of the fact that the vehicle has deviated from the route set in advance.

9. A navigation system for a vehicle, comprising:

present position detecting means for detecting the present location of the vehicle;

input means for inputting a destination or transit point and a departure point;

information storage means for storing road guidance data and identification data for identification of a distinctive object at an intersection or branch point;

output means for outputting guidance information, in the form of a visual display and/or a voice message, to provide route guidance;

route searching means for searching said road guidance data to determine an optimal route from the present location of the vehicle, as detected by said present position detecting means or from the departure point input by said input means, to a destination or a transit point input by said input means, based on data stored in said information storage means;

guidance control means for providing route guidance for said optimal route by execution of a navigation program utilizing data stored in said information storage means;

imaging means for obtaining an image of a road area ahead of the vehicle;

image recognition means for recognizing the distinctive object at the intersection or branch point in the obtained image;

advancing road identification means for determining the relative direction of movement of the recognized distinctive object within the obtained image and for identifying a road taken beyond the intersection or branch point based on the determined relative direction of movement; and judging means for judging if the identified road is on the optimal route; wherein, responsive to a judgement that the identified road is on the optimal route, said route searching means repeats said searching to determine a new optimal route; and wherein said guidance control means provides route guidance based on the determined new route or on the identified road.

10. A navigation system according to claim 7, wherein said image recognition means determines position coordinates for the recognized distinctive object at the intersection or branch point, and said advancing direction detection means determines the relative direction of movement of the object in the obtained image based on the determined position coordinates.

11. A navigation system according to claim 9, wherein said image recognition means determines position coordinates for the recognized distinctive object at the intersection or branch point, and said advancing direction detection means determines the relative direction of movement of the object in the obtained image based on the determined position coordinates.

12. A navigation system according to claim 11, wherein said image recognition means calculates a moving vector from difference between at least two coordinates of said distinctive object and determines relative direction of movement of the distinction object in the image from said moving vector.

13. A navigation system according to claim 10, wherein said image recognition means calculates a moving vector from difference between at least two coordinates of said distinctive object and determines relative direction of movement of the distinction object in the image from said moving vector.

14. A navigation system according to claim 11, wherein said information storage means stores a table of position coordinates of said distinctive object with respect to each road connecting to the intersection or branch point, and wherein said advancing road identification means refers to said table to identify the road taken by the vehicle in advancing beyond the intersection or branch point.

15. A navigation system according to claim 10, wherein said information storage means stores a table of position coordinates of said distinctive object with respect to each road connecting to the intersection or branch point, and wherein said advancing road identification means refers to said table to identify the road taken by the vehicle in advancing beyond the intersection or branch point.

16. A navigation system for a vehicle, comprising:

present position detecting means for detecting the present location of the vehicle;

input means for inputting information for calculating an optimal route;

output means for outputting route guidance;

information storage means for storing data for providing route guidance;

route setting means for setting an optimal route based on the information inputted by said input means and on the data stored in said information storage means;

route storage means for storing the route set by said route setting means;

guidance control means for outputting guidance information to said output means along the route set by said route setting means;

imaging means for obtaining an image of a road area ahead of the vehicle; and image recognition means for recognizing a distinctive object in the obtained image;

first judging means for judging if the present location detected by said present position detecting means is on the set optimal route, said guidance control means reading data relating to a guidance point ahead of the detected present location from said information storage means, responsive to a judgement that the detected present location is on the set optimal route;

guidance message setting means for composing a set guidance message relating to the guidance point based on the data read by said guidance control means;

second judging means for judging the position of the distinctive object recognized by said image recognition means relative to the guidance point; and guidance information correcting means for correcting the set guidance message based on the judgment of said second judging means, the corrected guidance message being output by said output means as route guidance.

17. A navigation system according to claim 16, wherein said guidance information correcting means corrects the set guidance message by adding an additional expression to the set guidance message.

18. A navigation system for a vehicle, comprising:

present position detecting means for detecting the present location of the vehicle;

input means for inputting information for determining an optimal route;

output means for outputting route guidance;

information storage means for storing data for providing route guidance;

route setting means for setting an optimal route based on the information input by said input means and on the data stored in said information storage means;

route storage means for storing the route set by said route setting means;

guidance control means for outputting guidance information to said output means along the route set by said route setting means;

imaging means for obtaining an image of a road area ahead of the vehicle;

image recognition means for recognizing a distinctive object in the obtained image;

first judging means for judging if the present location detected by said present position detecting means is on the set optimal route, said guidance control means reading data relating to a guidance point ahead of the present location from said information storage means responsive to a judgement that the detected present location is on the set optimal route;

guidance message setting means for composing and setting a guidance message relating to the guidance point;

second judging means for judging the position of the distinctive object recognized by said image recognition means relative to the guidance point; and guidance message output position determining means for determining a location for output of the set guidance message, based on the judgment of said second judging means.

19. A navigation system according to claim 16, wherein said guidance information correcting means corrects the set guidance message in accordance with the judgement of said second judging means.

20. A navigation system according to claim 16, wherein said guidance expression setting means composes a guidance message in accordance with distance between the guidance point and the detected present location.

21. A navigation system according to claim 18, wherein said guidance expression setting means composes a guidance message in accordance with distance between the guidance point and the detected present location.

22. A navigation system according to claim 16, wherein said guidance control means outputs the guidance message set by said guidance expression setting means at a point a predetermined distance in advance of the guidance point.

23. A navigation system according to claim 18, wherein said guidance control means outputs the guidance message set by said guidance expression setting means at a point a predetermined distance in advance of the guidance point.

24. A navigation system according to claim 22, wherein said guidance control means compares a first distance between the detected present location of the vehicle and the guidance point with a second distance between the recognized distinctive object and the detected present position and, if the difference between said first and second distances is not within a predetermined range, the second distance is used to set a point for output of the guidance message.

25. A navigation system according to claim 23, wherein said guidance control means compares a first distance between the detected present location of the vehicle and the guidance point with a second distance between the recognized distinctive object and the detected present position and, if the difference between said first and second distances is not within a predetermined range, the second distance is used to set a point for output of the guidance message.

26. A navigation system according to claim 16, wherein data relating to the distinctive object is correlated with the data relating to the guidance point in said storage unit and, when a distinctive object for which no data is stored is newly recognized by said image recognition means, data relating to the newly recognized distinctive object is written into said storage unit.

27. A navigation system according to claim 18, wherein data relating to the distinctive object is correlated with the data relating to the guidance point in said storage unit and, when a distinctive object for which no data is stored is newly recognized by said image recognition means, data relating to the newly recognized distinctive object is written into said storage unit.

28. A navigation system according to claim 16, wherein said distinctive object is a traffic signal.

29. A navigation system according to claim 18, wherein said distinctive object is a traffic signal.

30. A navigation system according to claim 16, wherein said distinctive object is a traffic sign.

31. A navigation system according to claim 18, wherein said distinctive object is a traffic sign.

32. A navigation system according to claim 30, wherein said traffic sign provides driving lane information.

33. A navigation system according to claim 31, wherein said traffic sign provides driving lane information.

34. A navigation system according to claim 16, wherein said distinctive object is a store signboard.

35. A navigation system according to claim 18, wherein said distinctive object is a store signboard.

* * * * *

UNITED STATES PATENT AND TRADEMARK OFFICE
CERTIFICATE OF CORRECTION

PATENT NO. : 6,018,697
DATED : January 25, 2000
INVENTOR(S) : MORIMOTO et al

It is certified that error appears in the above-identified patent and that said Letters Patent is hereby corrected as shown below:

Col. 22, line 9, after "is" insert --not--; and
        line 38, delete "distinction" insert
--distinctive--.

Signed and Sealed this

Fifteenth Day of May, 2001

Attest:

NICHOLAS P. GODICI

Attesting Officer    Acting Director of the United States Patent and Trademark Office